US012451256B2

(12) United States Patent
Jooste et al.

(10) Patent No.: US 12,451,256 B2
(45) Date of Patent: Oct. 21, 2025

(54) DISTRIBUTED NETWORK FOR THE SECURED COLLECTION, ANALYSIS, AND SHARING OF DATA ACROSS PLATFORMS

(71) Applicant: Akili Interactive Labs, Inc., Boston, MA (US)

(72) Inventors: H. Leroux Jooste, Arden, NC (US); Mae-ellen Gavin, Arlington, MA (US); Kristin Zibell, Boston, MA (US); Matthew Omernick, Larkspur, CA (US); Jeffrey Steinmetz, San Francisco, CA (US)

(73) Assignee: Akili Interactive Labs, Inc., Boston, MA (US)

( * ) Notice: Subject to any disclaimer, the term of this patent is extended or adjusted under 35 U.S.C. 154(b) by 0 days.

(21) Appl. No.: 18/591,668

(22) Filed: Feb. 29, 2024

(65) Prior Publication Data

US 2024/0282456 A1    Aug. 22, 2024

Related U.S. Application Data

(63) Continuation of application No. 16/603,193, filed as application No. PCT/US2018/026520 on Apr. 6, 2018, now abandoned.

(Continued)

(51) Int. Cl.
*G16H 50/30* (2018.01)
*G16H 10/60* (2018.01)
(Continued)

(52) U.S. Cl.
CPC ............ *G16H 50/30* (2018.01); *G16H 10/60* (2018.01); *G16H 20/10* (2018.01); *G16H 40/20* (2018.01);
(Continued)

(58) Field of Classification Search
CPC ........ G16H 50/30; G16H 80/00; G16H 20/10; G16H 50/20; G16H 50/70; G16H 10/60; G16H 40/20
See application file for complete search history.

(56) References Cited

U.S. PATENT DOCUMENTS 10,966,652 B1 *  4/2021  Giuffrida ............... G16H 20/10
2008/0312513 A1 * 12/2008  Simon .................... A61B 5/165
                                                              600/300
(Continued)

FOREIGN PATENT DOCUMENTS

WO      WO-2016172557 A1 * 10/2016 ............... A61B 5/24

OTHER PUBLICATIONS

Winstein et al, "Guidelines for Adult Stroke Rehabilitation and Recovery" American Heart Association Journals, (2016) (Year: 2016).*

(Continued)

*Primary Examiner* — Andrew Chase Lakhani
(74) *Attorney, Agent, or Firm* — Gregory Finch; Finch Paolino, LLC

(57) ABSTRACT

Computer-implemented methods and systems for managing the collection of and access to behavior assessment data. In an embodiment, a first user having authority to act on behalf of an individual under study identifies a second and third user role, specifies behavior data, symptom measurement data, and/or medicine regimen data associated with the individual under study, and defines access permissions for the second and third user roles with respect to the behavior data and symptom measurement data. The symptoms and behaviors to be measured are specified based on a condition of the individual. Users provide behavior data and symptom measurement data observed from the individual. An analytics module performs computational analysis on the behavior data and symptom measurement data, thereby producing (Continued)

behavior assessment data. A reporting module presents the behavior assessment data to the users in a manner consistent with the defined access permissions.

9 Claims, 22 Drawing Sheets

Related U.S. Application Data

(60) Provisional application No. 62/482,648, filed on Apr. 6, 2017.

(51) Int. Cl.
*G16H 20/10* (2018.01)
*G16H 40/20* (2018.01)
*G16H 50/20* (2018.01)
*G16H 50/70* (2018.01)
*G16H 80/00* (2018.01)

(52) U.S. Cl.
CPC ............ *G16H 50/20* (2018.01); *G16H 50/70* (2018.01); *G16H 80/00* (2018.01)

(56) References Cited

U.S. PATENT DOCUMENTS

| | | | |
|---|---|---|---|
| 2012/0150545 A1* | 6/2012 | Simon | A61B 5/6804 |
| | | | 704/270 |
| 2016/0117029 A1* | 4/2016 | Short | G16H 10/60 |
| | | | 463/31 |
| 2016/0210427 A1* | 7/2016 | Mynhier | G16H 10/60 |
| 2016/0262680 A1* | 9/2016 | Martucci | A61B 5/4088 |
| 2019/0299000 A1* | 10/2019 | Errico | A61B 5/1127 |
| 2020/0303073 A1* | 9/2020 | Granger | A61B 5/4088 |

OTHER PUBLICATIONS

Fichman et al, "A new Brief computerized cognitive screening battery (CompCogs) for early diagnosis of Alzheimer's Disease", Dementia & Neuropsychologica, 2(1), pp. 13-19 (2008) (Year: 2008).*

* cited by examiner

DISTRIBUTED NETWORK FOR THE SECURED COLLECTION, ANALYSIS, AND SHARING OF DATA ACROSS PLATFORMS

CROSS REFERENCE TO RELATED APPLICATIONS

This application is a continuation of U.S. patent application Ser. No. 16/603,193, entitled "DISTRIBUTED NETWORK FOR THE SECURED COLLECTION, ANALYSIS, AND SHARING OF DATA ACROSS PLATFORMS," which is the national stage of international application no. PCT/US2018/026520 filed Apr. 6, 2018, which claims priority to and the benefit of U.S. Provisional Patent Application Ser. No. 62/482,648 filed on Apr. 6, 2017, the disclosures of each of which are hereby incorporated by reference herein in their entirety.

FIELD OF THE DISCLOSURE

The present disclosure relates generally to a solutions platform configured for the secured collection and analysis of data, and the secured sharing of content between platforms. More particularly, embodiments relate to a solutions platform configured to facilitate monitoring and/or improved treatment of neuropsychological conditions.

BACKGROUND

Monitoring and/or improved treatment of a variety of different conditions is desirable, including in connection with dementia, Parkinson's disease, cerebral amyloid angiopathy, familial amyloid neuropathy, Huntington's disease, or other neurodegenerative condition, autism spectrum disorder (ASD), presence of the 16 pl 1.2 duplication, and/or executive function disorders, including attention deficit hyperactivity disorder (ADHD), sensory-processing disorder (SPD), mild cognitive impairment (MCI), Alzheimer's disease, multiple-sclerosis, schizophrenia, major depressive disorder (MDD), or anxiety. For example, patients, caregivers (including parents), and medical practitioners have indicated, including in user research and from clinical trial results, that heath tips related to ADHD symptoms and impairments would be helpful so they can take appropriate action (including upon consultation with a medical practitioner or healthcare provide where appropriate). Current drawbacks with the availability of content are lack of personalization and relevance to a patient's daily and weekly challenges and their symptoms.

SUMMARY

One of the biggest challenges for individuals with such conditions, or parents, custodians, and/or caregivers (including teachers) of individuals with such conditions, or healthcare providers, is the lack or inadequacy of systems that track and monitor over time the behavior and symptoms of the individual with a given condition. For example, where the individual has ADHD (whether an adult or a child), the capability to monitor securely the individual's symptoms and behaviors both at home and at school can be critical in the management and treatment of the condition. As another example, for an individual with depression (whether an adult or a child), the capability to monitor securely the individual's symptoms and behaviors can be beneficial for managing and treating the condition. Such data can assist the healthcare provider for an individual to determine what type of treatment and/or medication is effective or ineffective, to determine whether adjustments are to be made to the individual's treatment plan.

In view of the foregoing, apparatus, systems and methods are provided for monitoring and/or tracking at least one symptom and related behavior of a condition in an individual. In some examples, the apparatus, systems and methods are configured to analyze data indicative of the cognitive abilities of the individual having the condition, to provide insight into the relative health or strength of about portions of the brain of the individual. In certain configurations, the example apparatus, systems and methods can be configured to analyze data indicative of the status or progress of treatments for enhancing certain cognitive abilities of the individual having the condition.

Some advantages provided by embodiments of the disclosure include:

Providing patients and/or their caregivers (including parents) with simple tools to organize and track the health information of the individual with the condition, without recommendations to alter or change a previously prescribed treatment or therapy and share this information with the individual's health care provider as part of a management plan for a condition of an individual (including a disease-management plan);

Helping patients and/or their caregivers (including parents) self-manage their condition, including where the condition is a disease (including a child's disease or condition) without providing specific treatment or treatment suggestions;

Providing easier access to information related to patients' health conditions or treatments;

Supplementing professional clinical care by facilitating behavioral change, or coaching patients and/or their caregivers (including parents) with simple prompting and with methods applicable in clinical practice (including some routine methods);

Providing physician contextually relevant information by matching patient-specific information (e.g. diagnosis, treatments, signs or symptoms) to reference information routinely used in clinical practice to facilitate a physician's assessment of a specific patient; and Providing patients and providers with mobile access to health record systems or enable to gain electronic access to health information stored.

Accordingly, embodiments of the disclosure allow patients and/or their caregivers (including parents) to see helpful information based on the child's/patient's data and the community's data, so that the patients and/or their caregivers (including parents) can feel empowered and to help them to take the next appropriate action, including in consultation with the child's/patient's doctor (where appropriate).

In an aspect, embodiments of the disclosure relate to a system for managing the collection of and access to behavior assessment data. The system includes one or more processors; and a memory coupled with the one or more processors. The one or more processors execute a plurality of modules stored in the memory. The modules include a graphical user interface at which a first user having authority to act on behalf of an individual under study (i) identifies a second user role and a third user role, (ii) specifies one or more of behavior data, symptom measurement data, and medicine regimen data associated with the individual under study, and (iii) defines access permissions for the second and third user roles with respect to the behavior data and symptom measurement data. The symptoms and behaviors to be measured are specified based on a condition of the individual under study. Users provide behavior data and symptom measurement data observed from the individual under study according to either a second user role or third user role based at least in part on the access permissions specified by the first user.

An authentication module includes computer-executable instructions for enforcing the access permissions such that the second user role is limited to providing and accessing a first subset of the behavior data and symptom measurement data and the third user role is limited to providing and accessing a second subset of the behavior data and symptom measurement data.

An analytics module includes computer-executable instructions for performing computational analysis on the behavior data and symptom measurement data, thereby producing behavior assessment data.

A reporting module presents the behavior assessment data to the first user, second user, and third user in a manner consistent with the defined access permissions specified by the first user.

One or more of the following features may be included. The individual may be the first user. The analytics module may apply a classifier model to the provided behavior data and symptom measurement data to create a composite profile. The classifier model may include linear/logistic regression, principal component analysis, generalized linear mixed models, random decision forests, support vector machines, and/or artificial neural networks. The classifier model may identify a correlation between (i) the provided behavior data and symptom measurement data and (ii) data collected in connection with individuals who have exhibited desirable treatment response times. The correlation may identify at least one of an effective intervention, treatment efficacy, and drug performance. The classifier model may identify an impairment in the individual, the impairment not currently being treated. The analytics module may apply a classifier model for classifying the individual with respect to a likelihood of at least one of an onset or a progression of the condition.

The behavior assessment data supports a formulation of a course of treatment or modification of a course of treatment.

A usage analytics database may for store and provide usage analytics data to the analytics module.

An accounts and profiles database may store and transmit user account and profile data to the authentication module.

A preference database may store and transmit user preferences to the authentication module.

A health database may store and transmit health information data to the reporting module.

The symptom data may include performance metric data generated based on the individual's interactions with a cognitive platform.

A content module may be configured to generate one or more content queries based at least in part on the behavior assessment data. The content module may be further configured to submit the one or more content queries to at least one content library including a content index, and to analyze content received from the at least one content library to determine a relevance to a status of the individual determined based on the behavior assessment data.

In another aspect, embodiments of the disclosure relate to a computer-implemented method for managing the collection of and access to behavior assessment data. The method includes using one or more processors to execute instructions stored in one or more memory storage devices including computer executable instructions to perform operations including receiving instructions from a first user having authority to act on behalf of an individual under study. The instructions include the identification of a second user role and a third user role, specification of one or more of behavior data and symptom measurement data associated with the individual under study, and definition of access permissions for the second and third user roles with respect to the behavior data and symptom measurement data. The symptoms and behaviors to be measured are specified based on a condition of the individual under study.

Behavior data and symptom measurement data observed from the individual under part on the access permissions specified by the first user. Access permissions are enforced such that the second user role is limited to providing and accessing a first subset of the behavior data and symptom measurement data and the third user role is limited to providing and accessing a second subset of the behavior data and symptom measurement data.

Computational analysis is performed on the behavior data and symptom measurement data, thereby producing behavior assessment data. The behavior assessment data is presented to the first user, second user, and third user in a manner consistent with the defined access permissions specified by the first user.

One or more of the following features may be included. The individual may be the first user. The individual may be a child. The individual may be an adult.

At least a portion of the behavior data may include measurements of a behavior based on diagnostic and symptom criteria for a given condition. The behavior data may include at least one of homework assignment completion, frequency and quality of performing chores, and quality of getting along with a person acting on behalf of the individual.

At least a portion of the symptom measurement data may include measurements of a symptom on a clinically validated symptom list for a given condition. The symptom measurement data may include physiological data, such as, e.g., electrical activity, heart rate, blood flow, and/or oxygenation levels.

The first user may be a parent of the individual. The second user may be a teacher of the individual. The third user may be a practitioner treating the individual.

The behavior assessment data may include (i) pace of response of the individual to a treatment, (ii) a likelihood of onset and/or stage of progression of the condition, (iii) efficacy of medication at controlling a behavior, and/or (iv) efficacy of medication at addressing a symptom of the condition.

Performing computational analysis may include applying a classifier model to the behavior data and symptom measurement data to create a composite profile. The classifier model may include linear/logistic regression, principal component analysis, generalized linear mixed models, random decision forests, support vector machines, and/or artificial neural networks.

The classifier model may identify a correlation between (i) the provided behavior data and symptom measurement data and (ii) data collected in connection with individuals who have exhibited desirable response times. The correlation may identify an effective intervention, treatment efficacy, and/or drug performance.

A classifier model may be applied for classifying the individual with respect to a likelihood of at least one of an onset or a progression of the condition. The classifier model may identify an impairment in the individual that is not currently being treated.

Symptom data may include performance metric data generated based on the individual's interactions with a cognitive platform.

A content module may be configured to generate one or more content queries based at least in part on the behavior assessment data. The content module may be configured to submit the one or more content queries to at least one content library including a content index. Content received from the at least one content library may be analyzed to determine a relevance to a status of the individual determined based on the behavior assessment data.

In yet another aspect, a computer-implemented method for managing the collection of and access to behavior assessment data includes using one or more processors to execute instructions stored in one or more memory storage devices including computer executable instructions to perform operations including receiving instructions from a first user having authority to act on behalf of an individual under study, the instructions including the identification of a second user role and a third user role, specification of one or more of behavior data, symptom measurement data, and medicine regimen data associated with the individual under study, and definition of access permissions for the second and third user roles with respect to the behavior data and symptom measurement data, wherein the symptoms and behaviors to be measured are specified based on a condition of the individual under study.

Behavior data and symptom measurement data from users is received, the data being observed from the individual under study according to either a second user role or third user role based at least in part on the access permissions specified by the first user.

The access permissions are enforced such that the second user role is limited to providing and accessing a first subset of the behavior data and symptom measurement data and the third user role is limited to providing and accessing a second subset of the behavior data and symptom measurement data.

Computational analysis on the behavior data and symptom measurement data is performed, thereby producing behavior assessment data. The behavior assessment data is presented to the first user, second user, and third user in a manner consistent with the defined access permissions specified by the first user.

The condition is a neuropsychological condition, a neurodegenerative condition, or an executive function disorder.

One or more of the following features may be included. The individual may be the first user. The condition may be dementia, Parkinson's disease, cerebral amyloid angiopathy, familial amyloid neuropathy, Huntington's disease, autism spectrum disorder (ASD), presence of 16 pl 1.2 duplication, attention deficit hyperactivity disorder (ADHD), sensory-processing disorder (SPD), mild cognitive impairment (MCI), Alzheimer's disease, multiple-sclerosis, schizophrenia, major depressive disorder (MDD), or anxiety.

The individual may be a child with attention deficit hyperactivity disorder.

The first user may be a parent of the child. The behavior data may include homework assignment completion, frequency and quality of performing chores, and/or quality of getting along with the parent acting on behalf of the child. The symptom data may be inattentiveness, impulsivity, and/or hyperactivity.

The behavior assessment data may include (i) pace of response of the child to a treatment, (ii) a likelihood of onset and/or stage of progression of ADHD, (iii) efficacy of medication at controlling a behavior, and/or (iv) efficacy of medication at addressing a symptom of ADHD.

Contextually relevant content may be presented to the first, second, and third users. The second user may be a teacher. The third user may be a healthcare provider, and the behavior assessment data may support the third user in a formulation of a course of treatment or modification of a course of treatment.

The individual may be an adult with a major depressive disorder. The first user may be the adult.

The behavior data may be eating less, sleeping less, experiencing unexplained aches and pains, reduced interaction with friends and family, and/or absenteeism from work. The symptom data may include sadness, low self-esteem, loss of motivation, irritability, and decreased energy. The behavior assessment data may include (i) pace of response of the adult to a treatment, (ii) a likelihood of onset and/or stage of progression of the major depressive disorder, (iii) efficacy of medication at controlling a behavior, and (iv) efficacy of medication at addressing a symptom of the major depressive disorder.

Contextually relevant content may be presented to the first, second, and third users. The second user may be a family member of the individual. The third user may be a healthcare provider, and the behavior assessment data may support the third user in a formulation of a course of treatment or modification of a course of treatment.

In still another aspect, embodiments of the disclosure relate to a system for managing the collection of and access to behavior assessment data, the system including one or more processors and a memory coupled with the one or more processors. The one or more processors execute a plurality of modules stored in the memory, the plurality of modules including a graphical user interface at which a first user having authority to act on behalf of an individual under study identifies a second user role and a third user role, specifies one or more of behavior data and symptom measurement data associated with the individual under study, and defines access permissions for the second and third user roles with respect to the behavior data and symptom measurement data, wherein the symptoms and behaviors to be measured are specified based on a condition of the individual under study. Users provide behavior data and symptom measurement data observed from the individual under study according to either a second user role or third user role based at least in part on the access permissions specified by the first user.

An authentication module includes computer-executable instructions for enforcing the access permissions such that the second user role is limited to providing and accessing a first subset of the behavior data and symptom measurement data and the third user role is limited to providing and accessing a second subset of the behavior data and symptom measurement data.

An analytics module includes computer-executable instructions for performing computational analysis on the behavior data and symptom measurement data, thereby producing behavior assessment data. A reporting module presents the behavior assessment data to the first user, second user, and third user in a manner consistent with the defined access permissions specified by the first user.

The condition a neuropsychological condition, a neurodegenerative condition, or an executive function disorder.

One or more of the following features may be included. The individual may be the first user. The condition may be dementia, Parkinson's disease, cerebral amyloid angiopathy, familial amyloid neuropathy, Huntington's disease, autism spectrum disorder (ASD), presence of 16 pl 1.2 duplication, attention deficit hyperactivity disorder (ADHD), sensory-processing disorder (SPD), mild cognitive impairment (MCI), Alzheimer's disease, multiple-sclerosis, schizophrenia, major depressive disorder (MDD), or anxiety.

The individual may be a child with attention deficit hyperactivity disorder. The first user may be a parent of the child.

The behavior data may include homework assignment completion, frequency and quality of performing chores, and/or quality of getting along with the parent acting on behalf of the child. The symptom data may be inattentiveness, impulsivity, and/or hyperactivity. The behavior assessment data may include (i) pace of response of the child to a treatment, (ii) a likelihood of onset and/or stage of progression of ADHD, (iii) efficacy of medication at controlling a behavior, and/or (iv) efficacy of medication at addressing a symptom of ADHD.

The reporting module may present contextually relevant content to the first, second, and third users. The second user may be a teacher. The third user may be a healthcare provider and the behavior assessment data may support the third user in a formulation of a course of treatment or modification of a course of treatment.

The individual is an adult with a major depressive disorder. The first user may be the adult.

The behavior data may include eating less, sleeping less, experiencing unexplained aches and pains, reduced interaction with friends and family, and/or absenteeism from work. The symptom data may be at least one of sadness, low self-esteem, loss of motivation, irritability, and/or decreased energy. The behavior assessment data may include (i) pace of response of the adult to a treatment, (ii) a likelihood of onset and/or stage of progression of the major depressive disorder, (iii) efficacy of medication at controlling a behavior, and/or (iv) efficacy of medication at addressing a symptom of the major depressive disorder.

The reporting module may presents contextually relevant content to the first, second, and third users. The second user may be a family member of the individual. The third user may be a healthcare provider, and the behavior assessment data may support the third user in a formulation of a course of treatment or modification of a course of treatment.

In this aspect or any one or more of the other aspects described herein, the individual can be the first user.

The exemplary system, method or apparatus (including an App) described herein provides targeted output based on data gathered from the objective and observational measures of the patients symptoms and certain behaviors exhibited by the patient. The type of the conditions (e.g., cognitive deficit) determines the symptoms measured and the behaviors that are tracked. The behavior data is based on validated behavior scales (such as but not limited to the Vanderbilt scale). The specific symptoms and behaviors are relevant to individual based on his/her condition (cognitive deficit). The exemplary system, method or apparatus (including an App) allows a unique level of personalization, including in an automated way, resulting in predictive contents that are output from the exemplary system, method or apparatus (including an App). The output can be presented or transmitted in any way specified by the first user (i.e., the user that sets permissions for the other users, also referred to herein as user 1).

The first user specifies the care-team for the individual under study, and specifies/delegates the symptoms and behaviors of the individual for which each of the other user is to provide data. For example, if the condition (cognitive deficit) is ADHD and the individual under study is a child, the first user can be a parent, guardian, or other caregiver. The first user grants levels of permissions to a teacher, medical practitioner, etc. The parent provides data indicative of information such as type of medication the child is on, amount of dosage/dose titration, consistency of dose regimen; data indicative of symptoms such as attentiveness, impulsiveness, level of activity; and behaviors such as success or failure at completion of homework assignment, "acting up", ability to sit still, taking direction, etc. A teacher can provide data relevant to each or some of the symptoms and behaviors at differing times of the day and in differing situations/contexts. The exemplary system, method or apparatus (including an App) facilitates collection of measurement data throughout day, to more accurately assess behaviors and level of symptoms in the individual in different contexts (e.g., school, homes, medical office, etc.).

The first user has the ability to personalize behaviors and symptoms specifically to the patient/individual under study. For example, since every child is different, the exemplary system, method or apparatus (including an App) facilitates tracking over time to assess the progress of the child, and the first user (e.g., the patient, a caregiver or a parent) can get measurement-based care for the child, and can tailor the care of the individual to address elements of the child's impairment that are not responding to treatment, behavior therapy, and/or medication.

The ability for the system and processes to track and monitor personalized symptoms and behaviors is specific from patient to patient. By understanding what symptoms are progressing or not progressing over time, the results/output of the analysis from the exemplary system, method or apparatus (including an App) over time can be used to indicate symptoms that are not yet being treated. As a result, the exemplary system, method or apparatus (including an App) can act like a biomarker for symptoms that are not adequately responding to treatment. These particular combinations/data trends of symptom and behaviors can become representative of a particular impairment(s) that can afflict a child.

The symptoms assessed using the symptom data are determined based on the condition (cognitive deficit) of the individual (e.g., a neurodegenerative condition or an executive function disorder). The symptoms assessed are based on validated instruments for symptoms of a condition (e.g., based on validated instruments used by medical professionals). The behaviors to be measured are developed based on these symptoms, e.g., when a symptom is inattentiveness, the behaviors monitored can be degree of completion of homework, etc. The symptoms and behaviors tracked over time can be customized based on the individual child's treatment needs, such as behaviors set based on the functional ability of child to act in a healthy way.

The measurement-based care can be tuned/tweaked to each individual patient over time. This allows informed and better treatment decisions for identifying and treating the impairments not being initially treated in the patient. Accordingly, the exemplary system, method or apparatus (including an App) enables the identification of untreated impairments.

The exemplary system, method or apparatus (including an App) and process also tracks the current treatments the patient is taking, and also tracks side effects and/or adverse events and prepares a narrative on how a treatment (e.g., a drug for ADHD or depression) affects the patient. For example, a drug treatment for ADHD can result in appetite suppression, weight gain, anxiety, and/or disrupted sleep pattern, because of an improper/insufficient dosage, or drug interactions. The data and analysis from the exemplary system, method or apparatus (including an App) all adds to information for measurement-based care of the individual for better treatment outcome for the patient in a way interpretable by stakeholder/patient.

Based on the results of the data analysis, output can be displayed/transmitted to the first user based on the analysis results indicative of specific impairment(s) of the individual. The process and exemplary system, method or apparatus (including an App) is configured to algorithmically identify through another course and resource specific support programs/initiatives/programs/other items that the first user (e.g., parent) can implement to address the impairment(s). This can include practical health advice. The exemplary system, method or apparatus (including an App) can be configured to formulate queries to send out to external resources based on the impairment(s) identified from the analysis. The queries to get the health advice/!initiatives/programs/other information can be sent out to a contents library specific to an indication (e.g., ADHD, depression, etc.), or to a society that serves a particular community (e.g., CHADD for ADHD), a national resource center, or journal or other literature specific to the patient's satiation (e.g., the child). The exemplary system, method or apparatus (including an App) can help the first user download the articles/resources/behavioral therapy resource or provide other ways to get access to the targeted resource. For example, when the symptom/behavior data indicates that the child patient has difficulty completing homework, the exemplary system, method or apparatus (including an App) can identify resources to help the child do homework (e.g., study tips or exercises).

The exemplary system, method or apparatus (including an App) maps out predictive content that can be used to help identify appropriate resources to the first user regarding what could help the patient (e.g., child or adult). The data and analysis from each patient of a plurality of patients can be used to build a database based on hundreds of patients, and their responses or lack of responses to a treatment, the impairment(s) identified, and their responses to the resources presented. The provides predictive models based on the previous experience of hundreds of patients. Accordingly, the first user can know before trying whether a particular new drug or other treatment, or what dosage of the drug or other treatment, are most likely to help patient (e.g., child or adult) or what may potentially exacerbate an impairment or a poorly treated symptom or a poorly managed behavior. The exemplary system, method or apparatus (including an App) may also indicate the possible outcome that may be attained if the individual follows the recommendation.

BRIEF DESCRIPTION OF FIGURES

FIGS. 11A-11D are tables of examples of the types of data and other information that can be included in an enhanced analysis report, in accordance with an embodiment of the disclosure;

FIGS. 12A-12B are graphical representations of the graphical user interfaces that the solutions platform can be configured to be rendered to allow user 1, user type 2, and/or user type 3, as applicable, to enter quantifiers of behavior measures or symptom measures, the types of measurement fields that can be rendered for display at the graphical user interface for entry of the ratings and scales by user 1, user type 2, and/or user type 3, and the types of rating and quantification scales that can be provided in the measurement fields, in accordance with embodiments of the disclosure;

DETAILED DESCRIPTION

Figure 1:
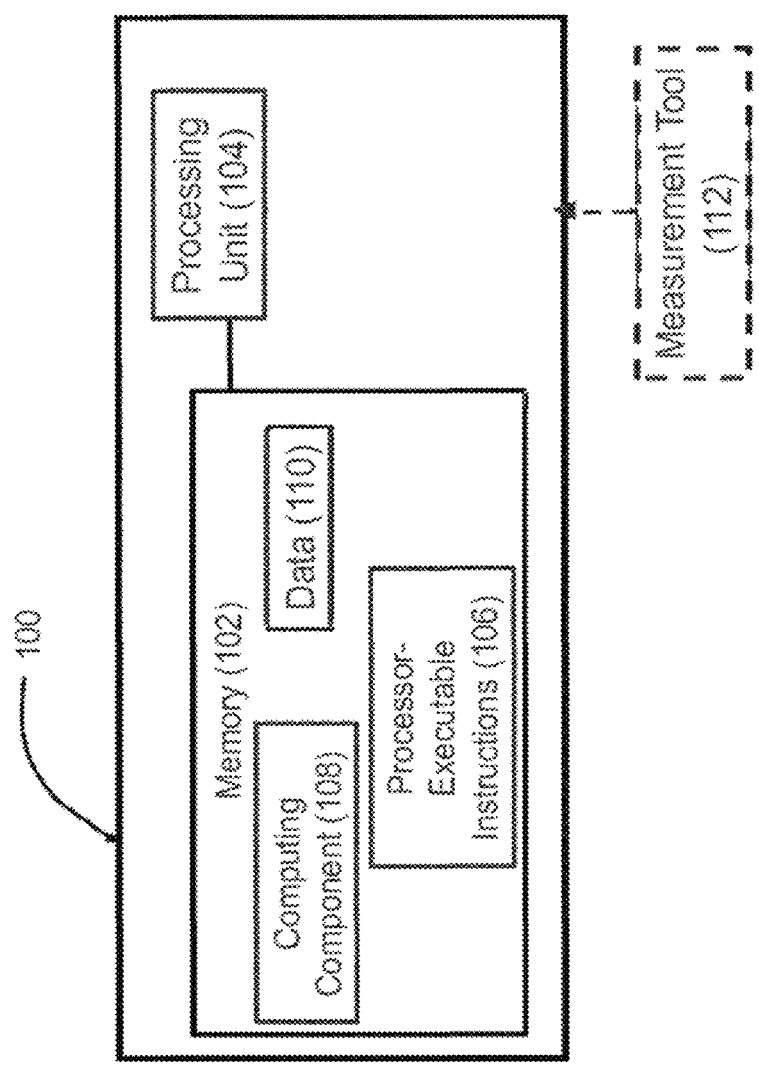
FIG. 1 is a block diagram of an exemplary apparatus for implementing certain functionalities of the solutions platform including the analytics engine (including classifier model) and report generator, in accordance with an embodiment of the disclosure.

It should be appreciated that all combinations of the concepts discussed in greater detail below (provided such concepts are not mutually inconsistent) are contemplated as being part of the inventive subject matter disclosed herein. It also should be appreciated that terminology explicitly employed herein that also may appear in any disclosure incorporated by reference should be accorded a meaning most consistent with the particular concepts disclosed herein.

As used herein, the term "includes" means includes but is not limited to, the term "including" means including but not limited to. The term "based on" means based at least in part on.

Following below are more detailed descriptions of various concepts related to, and embodiments of, inventive methods, apparatus and systems comprising a solutions platform configured for the secured collection and analysis of data, and the secured sharing of content between platforms. The content can be, but is not limited to, the collected data and/or the results of the data analysis.

The solutions platform can be coupled with one or more types of measurement components, for receiving and analyzing data collected from at least one measurement of the one or more measurement components. As non-limiting examples, the measurement component can be a physiological component.

The solutions platform can be coupled with one or more types of cognitive platforms, for analyzing data collected from user interaction with the cognitive platform. As non-limiting examples, the cognitive platform and/or platform product can be configured for cognitive monitoring, cognitive assessment, cognitive screening, and/or cognitive treatment, including for clinical purposes. The data from the cognitive platform can be used by the exemplary systems, methods, and apparatus disclosed herein as symptom measurement data.

As a non-limiting example, the cognitive platform can be based on the Project: EVO™ platform by Akili Interactive Labs, Inc. (Boston, MA).

The exemplary solutions platform can be implemented to facilitate monitoring and/or improved treatment of a variety of different conditions, such as but not limited to neuropsychological conditions, including dementia, Parkinson's disease, cerebral amyloid angiopathy, familial amyloid neuropathy, Huntington's disease, or other neurodegenerative condition, autism spectrum disorder (ASD), presence of the 16 pl 1.2 duplication, and/or executive function disorders, including attention deficit hyperactivity disorder (ADHD), sensory-processing disorder (SPD), mild cognitive impairment (MCI), Alzheimer's disease, multiple-sclerosis, schizophrenia, major depressive disorder (MDD), or anxiety.

In a non-limiting example, the solutions platform can be configured to facilitate monitoring and/or improved treatment of ADHD. Symptoms of ADHD include inattentiveness, impulsivity and hyperactivity. Both children and adults can have ADHD, however, the symptoms can be exhibited beginning in childhood. ADHD can be considered a chronic disease in certain aspects. Once diagnosed, it is typically treated with medications and managed through behavioral therapies.

One of the biggest challenges for individuals with ADHD, or parents, custodians, and/or caregivers (including teachers) of individuals with ADHD, or healthcare providers, is the lack or inadequacy of systems that track and monitor over time the behavior and symptoms of the individual with ADHD. For example, where the individual with ADHD is a child, the capability to monitor securely the individual's behaviors both at home and at school can be critical in the management and treatment of the condition (including a disease). Such data can assist the healthcare provider for an individual in determining what type of treatment and/or medication is effective or ineffective, in order to determine whether adjustments are to be made to the individual's treatment plan.

In any example herein, the term "healthcare provider" encompasses one or more of a physician (including a pediatrician and/or a behavioral specialist), a nurse, a physician's assistant, a psychologist, a psychiatrist, and the supporting clinical and administrative office staff of a healthcare or medical facility.

In a non-limiting implementation, the solutions platform can be configured to include components that facilitate the collection of data indicative of behavior metrics and symptom metrics for activities of an individual (such as but not limited to a child with ADHD), components that facilitate the capture of data indicative of a status or progress of a treatment plan for a condition of the individual, and components that provide meaningful analysis of the data.

In an example, the solutions platform can be configured to collect and analyze content that assist with monitoring progress and/or modifying the individual's treatment plan.

In another example, the solutions platform can be configured to assist in improving the results of a treatment using visualizations.

In another example, the solutions platform can be configured as an application (App) for use by a parent, custodian, guardian or other caregiver of a child. The solutions platform in this example can be configured to provide secured, authenticated access for the platform gives parent, custodian, guardian or other caregiver of the child the capability to control the level and type of access that another user can have to the platform, thereby facilitating the collection of data indicative of behavior measures and/or symptom measures from other user through a secured access (such as but not limited to a secured login).

In this non-limiting exemplary implementation, the solutions platform may be configured such that an individual (including a parent, custodian, or other caregiver of an individual) may download an aspect of it as an App and use the App to collect behavior and symptom data about the individual (including the child) on a regular basis. The App provides reminders and encouragement to ensure consistent, long-term engagement by the individual (including a parent, custodian, or other caregiver of an individual). The App is configured to provide the primary user the capability to request behavior data from another designated user (such as but not limited to a teacher or other caregiver of the individual). The request may be sent through a secured invitation delivered via email or other means. As an example, when the other, secondary user receives the invitation, they access the secure link provided, provide the information requested to set up an account (such as but not limited to login credentials) to be accessed at intervals to enter data and other information in the measurement fields provided (such as but not limited to information on how the child is behaving in school or to quantify measures of the individual's symptoms).

Such an App may also provide the capability for an individual (including a parent, custodian, or other caregiver of an individual) to enter information from an assessment (such as but not limited to the Vanderbilt assessment scales) and derive quantifiable measures that track treatment data such as but not limited to compliance to taking medication, attendance to physician appointments, response to behavioral therapy, etc.

In any example herein, the solutions platform provides user 1 with the capability and graphical user interfaces to set the types of alerts and notifications to be sent to user types 2 and user types 3. For example, the graphical user interfaces can provide user 1 with the capability to set alerts and notifications according to the permission and access levels set, such as but not limited to, when enhanced analysis reports (including progress reports) are available for viewing by those with the appropriate permission levels, when progress is improving or declining in order to monitor the progress of the individual's treatment (such as but not limited to a child's treatment, when the individual meets a given treatment milestone (including whether such milestone is arrived at by using a certain dosage or regimen of a drug, pharmaceutical agent, biologic, or other medication, when an individual's treatment performance is improving, stable, or declining (including by computing a projected performance level for the individual), when user 1 or other user type is required to retrieve a graphical user interface to complete a symptom tracker, a behavior checklist, or other metric, in the solutions platform.

In non-limiting examples of a solutions platform for use in ADHD, the type of behavior metrics that are quantified can be behavior metrics related frequency and quality of homework assignment completion, frequency and quality of performing chores, and the quality of getting along with the parents, custodians, guardians, or other individual acting on behalf of a child. The exemplary symptom metrics can be set using scores from other symptom trackers.

In non-limiting examples of a solutions platform for use in ADHD, an enhanced analysis report can be generated to provide data, analysis and visualizations indicative of any presence of ADHD symptoms based on data entered by user 1, or other user types, the presence of ADHD symptoms based on scores of an assessment tool used at diagnosis, the presence of ADHD-related problems and symptoms specific to the patient (for example, a parent's assessment of unruly behavior in school), a measure of an individual patient's improvement and effort within the treatment, a measure created by the solutions platform (including using a classifier) to compute a projection that indicates a higher or lower likelihood of treatment improvement or decline, an indication of an individual's or parent (or other user 1 type) satisfaction or dissatisfaction with the progress of a treatment, a metric of progress of a treatment, user 1 or other user type (e.g., parent and teacher) assessment or report, number of daily treatments completed per week or month was desired to be quantified.

Based on permissions (using control signals) set by the primary user, the solutions platform can be configured to analyze the data collected from the individual (including a parent, custodian, or other caregiver of an individual). The solutions platform can be configured to generate enhanced analysis reports based on the analysis and provide the report to the individual (including a parent, custodian, or other caregiver of the individual) in visualizations that provide them with information on how the individual is progressing over time. Based on permissions (using control signals) set by the primary user, these visualizations can be shared with the individual's healthcare provider (such as but not limited to a child's physician) and used to discuss progress and/or modification to a treatment plan for the individual. Based on permissions (using control signals) set by the primary user, the solutions platform can be configured to allow the healthcare provider to view the enhanced analysis report (including any data). For example, the healthcare provider may view the enhanced analysis report from the parents App and/or the parent can email the healthcare provider an invitation to set up an account to log into the solutions platform (once authenticated) and view the data collected on the child.

The solutions platform is configured to allow a primary user to work with a healthcare provider to determine the behaviors to be presented in the measurement fields of the solutions platform and quantified using the solution platform.

The exemplary solutions platform allows users (such as but not limited to parent, teacher, physicians, behavioral therapists, etc.), to provide quantifiable measures of a variety of symptoms, also captures data from actual treatments (such as but not limited to scores from a cognitive treatment and other treatment), analyzes the collected data, an generates an enhanced analysis report that presents the data and analysis results in a form of interpretable, meaningful metrics, which can be used to determine if treatment is progressing adequately or satisfactorily.

The enhanced analysis report can be used in consultation with a healthcare provider to evaluate the individual's response to the treatment, determine any modifications to be made to the treatment, the overall time period for implementation of the modifications to the treatment, etc., in order to derive a stable outcome or an improved outcome of the treatment for the individual. This can result in a better condition management (including disease management) outcome for the individual.

In any example herein, the solutions platform provides control settings such that the access level and permissions for a secondary user set by a primary user may be revoked or overruled.

The exemplary systems, methods, and apparatus according to the principles herein provide a set of management solutions and services that are configured to collect data indicative of behaviors and symptoms of a subject having a condition, in order to quantifiably track and monitor the subject's progress with one or more treatments (such as but not limited to ADHD treatments).

While the capabilities and functionalities of the solutions platform can be described relative to an implementation directed to ADHD, the solutions platform of the instant disclosure is not so limited. An exemplary solutions platform can be directed to other types of conditions, including neuropsychological conditions and/or other executive function disorders.

Exemplary systems, methods, and apparatus herein provide a solutions platform that is configured to provide controlled access via a distributed network to distributed data assets, and to generate enhanced analysis reports based on the data assets.

It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes. The exemplary methods, apparatus and systems comprising the solutions platform can be used by an individual (including a parent of an individual), a clinician, a physician, and/or other medical or healthcare practitioner to provide data that can be used for an assessment of the individual.

While an example is provided of the solutions platform configured for ADHD, the solutions platform can also be configured for other conditions, such as but not limited to depression, bipolar depression, schizophrenia, or other condition as described herein. In each of these conditions, the pertinent behavior measures and symptom measures are configured in the solutions platform for rating, and the data collected is analyzed to provide useful measures.

Behaviors are a customized list that reflect the patient's ability to perform a behavior. The list values and ability rankings are as described herein, and allow for the customization. In a non-limiting example, the behaviors measured using the solutions platform can be based, at least in part, on one or more DSM-5 diagnostic and symptom criteria for a given disease or condition.

The symptoms measured using the solutions platform can be based, at least in part, on one or more symptoms on clinically validated symptom lists that also reflect DSM-5 diagnostic and symptom criteria for a given disease. Non-limiting examples include the Vanderbilt assessment and follow up questionnaires, Vanderbilt Assessment Follow-up for pediatric ADHD or the PHQ-9 for major depressive disorder.

While the examples are described relative to behavior measures or symptom measures, other types of measures are also applicable to the solutions platform.

As described herein, the exemplary systems, methods, and apparatus according to the principles herein can be implemented using at least one processing unit of a programmed computing device, to provide certain functionalities of the solutions platform. FIG. 1 shows an exemplary apparatus 100 according to the principles herein that can be used to implement certain functionalities of the solutions platform including the analytics engine (including classifier model) and report generator described hereinabove herein. The example apparatus 100 includes at least one memory 102 and at least one processing unit 104. The at least one processing unit 104 is communicatively coupled to the at least one memory 102.

Example memory 102 can include, but is not limited to, hardware memory, non-transitory tangible media, magnetic storage disks, optical disks, flash drives, computational device memory, random access memory, such as but not limited to DRAM, SRAM, EDO RAM, any other type of memory, or combinations thereof. Example processing unit 104 can include, but is not limited to, a microchip, a processor, a microprocessor, a special purpose processor, an application specific integrated circuit, a microcontroller, a field programmable gate array, any other suitable processor, a graphical processing unit (GPU), or combinations thereof.

The exemplary solutions platform can be configured to apply a classifier model, using computational techniques and machine learning tools, such as but not limited to linear/logistic regression, principal component analysis, generalized linear mixed models, random decision forests, support vector machines, or artificial neural networks, to the collected data to create composite variables or profiles that are more sensitive than each measurement data value alone. For example, the analysis of the data collected can be used to provide a stage of progression of a condition (including a neurodegenerative condition). In another example, the analysis of the data collected can be used to provide a determination of the efficacy of medication at controlling a behavior, or addressing a symptom of a condition.

Any classification of an individual using the classifier model as to the likelihood of onset and/or stage of progression of a condition (including a neurodegenerative condition) according to the principles herein can be transmitted as part of an enhanced analysis report as a signal to a medical device, healthcare computing system, or other device, and/or to a medical practitioner, a health practitioner, a physical therapist, a behavioral therapist, a sports medicine practitioner, a pharmacist, or other practitioner, to allow formulation of a course of treatment for the individual or to modify an existing course of treatment, including to determine a change in dosage of a drug, biologic or other pharmaceutical agent to the individual or to determine an optimal type or combination of drug, biologic or other pharmaceutical agent to the individual.

In an example, the classifier model can be trained using data in a database that is collected in connection with individuals who have exhibited desirable response times, to identify correlations in the data. The identified correlations can help to identify effective interventions, treatment efficacy, drug performance, etc. in connection with the condition of interest.

In other examples, the computational models (including the classifier models) may incorporate multiple features other than just response time, such as but not limited to, various motor functions, working memory accuracy, and other motor function measurements and cognitive tasks.

In another example, the classifier model can be rules-based, based on the type of conclusions that can be drawn based on a set of values of the type of data collected in the implementation of the solution platform.

In an example, a result of the application of the classifier model to the data collected is an enhanced report that includes suggested courses of action for a healthcare provider to evaluate. The enhanced analysis report also can include data indicative of the progress of the individual that a primary user specifies is to be shared with the healthcare provider.

In any example, the classifier model can be trained using training measurement data from subjects that are classified as to a known likelihood of onset and/or stage of progression of a condition or treatment responsiveness of a subject. In addition, the exemplary classifier model can be further refined as to the classification of individuals as to the desired classification. For example, the classifier model can be trained based on data indicating the progression over time of a set of symptoms, and be applied to data from an unclassified individual to project how the individual may be expected to response over time or projected compliance with a therapy. For example, data may be collected based on behavior measures for behaviors that correlate with poorer compliance with a therapy or response to a treatment. The pattern identified using the classifier model can be used to show the potential effect of a certain modification to a treatment plan. For example, behavior measures in the areas of the behaviors of hyperactive, Inattentive, and impulsiveness can be by a classifier model in the application directed to the treatment of ADHD.

In any example herein, the behavior measures and/or symptom measures can be quantified using discrete settings, numerical rating values, sliding scale quantifiers, or other measure that is received as data to the solutions platform. In some examples, the behavior measures and/or symptom measures can be quantified based on a frequency or number of times of appearance of such symptom or behavior (as applicable), of intensity of experience of such symptom or behavior (as applicable).

In any example herein, the collected data from multiple individuals can be analyzed (with authorization) to allow population-based analysis to influence and inform treatment practices. Such population-based analysis can allow for improved health outcomes in a number of ways that could be superior to existing treatments or other platforms. In an example, the population-based analysis can be used to set the rating (or other quantification scales) for the metrics measured using the measurement fields (including the behavior measures and/or the symptom measures), including for setting the threshold values or discrete values of any of the rating scales, or to determine the types of behavior and/or symptom or other measures that are more sensitive predictors of outcome (whether good outcome or bad outcome).

In any example herein, the data collected over time can be analyzed to provide a measure of the individual's performance, including as an individual, and also as compared to a population group.

In any example herein, the individual need not be undergoing a treatment or taking any medication in order to gain the benefit of the solutions platform. For example, an individual can use the solutions platform to monitor behaviors and symptoms for the purpose of the user understanding the worsening or improvement of the symptom(s) and/or behavior(s) of interest.

In FIG. 1, the at least one memory 102 is configured to store processor-executable instructions 106 and a computing component 108. In a non-limiting example, the computing component 108 can be used to analyze the data received and/or to generate the enhanced report as described herein. As shown in FIG. 1, the memory 102 also can be used to store data 110, computation results from application of at least one exemplary classifier model to the received data, measurement data received at the measurement fields (including one or more of a behavior measure and a symptom measure), and/or data indicative of the response of an individual to one or more treatments (including treatment using a cognitive tool). As described herein, the plurality of measurement fields may be rendered at a graphical user interface of a user device, and data received at the measurement fields can be stored at the memory 102. In various examples, the data 110 can be received from one or more measurement tools 112, such as but not limited to one or more physiological or monitoring components and/or one or more components configured for cognitive monitoring, assessment, screening, and/or treatment.

While reference is made to a "measurement tool" in this and other examples, it is to be understood that the measurement tool may perform not merely measurements, but also to provide cognitive and/or physiological measurements, monitoring, assessment, screening, and/or treatment.

In various non-limiting examples, the measurement field can include measurement parameters, such as but not limited to behavior measures, symptom measures, medication and therapy compliance measures (including type of medication, medication dosage levels, medication use compliance measures), and/or quantifiable measures of mood or state of mind. The measurement field may also allow comments in prose form from the user/contributor (such as but not limited to a diary-like entry field), to allow a user to comment on an individual's status, progress, mood, or other parameter. For example, the diary can be used by a user to indicate the occurrences during a given time period for an individual, e.g., whether the impression is that treatments are progressing on course, whether an individual is reacting somewhat poorly to a treatment, an individual's mood, an individual's impulse behavior, etc.

In a non-limiting example, the at least one processing unit 104 executes the processor-executable instructions 106 for the analysis engine stored in the memory 102 at least to analyze the data received in response to the measurement fields, using the computing component 108. The at least one processing unit 104 also can be configured to execute the processor-executable instructions 106 for the analysis engine stored in the memory 102 to analyze the data from the one or more measurement tools 112 as described herein, using the computing component 108. The at least one processing unit 104 also can be configured to execute processor-executable instructions 106 stored in the memory 102 to apply an exemplary classifier model to the data received in response to the measurement fields, to provide the analysis results used at least in part to generate the enhanced analysis report. In various examples, the enhanced analysis report can include computation results indicative of the classification of an individual according to status, and/or likelihood of onset, and/or stage of progression of a condition, including as to a neurodegenerative condition and/or an executive function disorder. The at least one processing unit 104 also executes processor-executable instructions 106 to control a transmission unit to transmit values indicative of the analysis of the data received in response to the measurement fields and/or data from the measurement tool 112 as described herein, and/or control the memory 102 to store values indicative of the analysis of the data.

Figure 2:
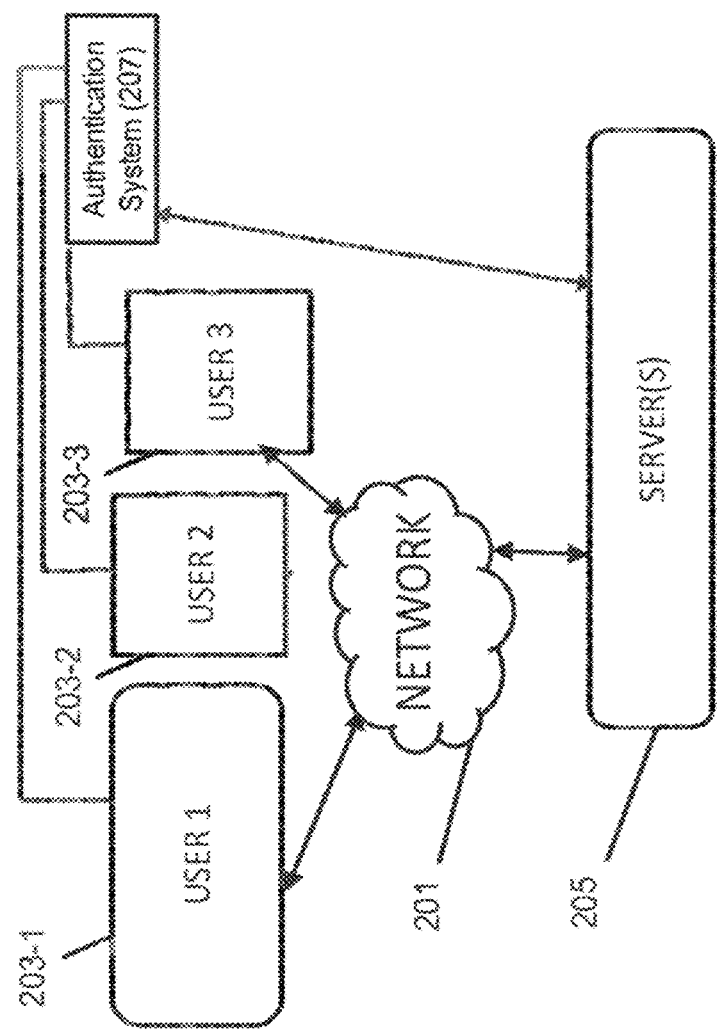
FIG. 2 is a block diagram of an exemplary network environment suitable for a distributed implementation of the solutions platform, in accordance with an embodiment of the disclosure.

FIG. 2 is a block diagram of an exemplary network environment suitable for a distributed implementation of the solutions platform. The network environment can include one or more servers 205 that are configured to communicate with user devices 203-1 (I=1, 2, and 3) via a network 201. The solutions platform is configured to provide control to user device 203-1 of user 1 to set the user types and permission levels and access type associated with each other user type in the group. For example, user device 203-1 can be used to send control signals that set a first set of permission levels and access levels of user 1, a second device 203-2, and a third (restricted) set of permission levels and access levels for user type 3 associated with user device 203-3. In order to gain access to the exemplary solutions platform, each user is required to be authenticated via an authentication system 207. On receipt at the server(s) 205 of the authentication of a given user type, the server 205 is configured to grant access to the user type to the hosted applications and/or content that are allowed based on the permission levels set by the control signals from user device 203-1.

As used herein, the term "server" encompasses hardware and/or software that provide the functionality described herein, whether the particular functionality is embodied in a single centralized configuration or is over a distributed configuration. Each functionality of the server(s) described herein may be performed using multiple intercommunicating computing systems or using a single computing system programmed to perform different server functionalities.

As will be appreciated, various distributed or centralized configurations may be implemented, and in some embodiments a single server can be used. Similarly, the user devices 203-1 may be incorporated into a single terminal.

While not shown in FIG. 2, the network environment may also include one or more databases associated with server 205. In various examples, the one or more databases can be used to store user identifying information, the health information of one or more individual(s), data indicative of the measures collected from the user(s) (including behavior measures and/or symptom measures), or other data described herein; while the server(s) 205 can store analytics engines and/or report generating engines which can implement one or more of the processes described herein. The exemplary analytics engine can be used to apply an exemplary classifier model to the data received in response to the measurement fields, to provide the analysis results used at least in part to generate the enhanced analysis report.

An electronic display device (not shown) associated with user device 203-1 may display a rendered graphical user interface (GUI) to a user as described herein. Once the display device receives instructions from the server 205, the GUI may be rendered to allow an individual to interact with the servers to implement processes described herein, including defining the other user types, setting the permission levels and access levels of the defined user types, displaying fields for entering measurement data, and receiving the measurement data, as described herein.

The exemplary network 201 may include, but is not limited to, the Internet, an intranet, a LAN (Local Area Network), a WAN (Wide Area Network), a MAN (Metropolitan Area Network), a wireless network, an optical network, and the like. In various examples, the user device 203-1 is in communication with the server 205 and database(s) and can generate and transmit database queries requesting information from the raw data matrices or database(s). The server 205 can transmit instructions to the user device 203-1 over the network 401. The server 205 can interact with the user device 203-1 and database(s) over network 401 to render the GUI on the user device 203-1, as described herein.

A user device 203-1 may include, but is not limited to, one or more of work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, game consoles, set-top boxes, network PCs, mini-computers, smartphones, tablets, netbooks, and the like. The user devices 203-1 may include some or all components described in relation to computing device(s) described herein (including as shown in FIGS. 2-6).

Any user device 203-1 may connect to network 401 via a wired or wireless connection. The user device 203-1 may include one or more applications such as, but not limited to, a web browser and the like. In an exemplary embodiment, the user device 203-1 may perform all the functionalities described herein.

In other embodiments, the server(s) 205 performs the functionalities described herein. In yet another embodiment, the user device 203-1 may perform some of the functionalities, and server(s) 205 performs the other functionalities described herein.

Each of the databases (not shown), and servers 205 may be connected to the network 201 via a wired connection. Alternatively, one or more of the databases (not shown) and servers 205 may be connected to the network 201 via a wireless connection. Although not shown, server 205 can be (directly) connected to the database(s). Servers 205 comprises one or more computers or processors configured to communicate with user device 203-1 via network 201. Servers 205 hosts one or more applications or websites accessed by user device 203-1 and/or facilitates access to the content of the database(s). Servers 205 may include one or more components described in relation to system 100 shown in FIG. 1. The database(s) include one or more storage devices for storing data and/or instructions (or code) for use by servers 205, and/or user device 203-1. The database(s) and/or servers 205, may be located at one or more geographically distributed locations from each other or from user device 203-1. Alternatively, the database(s) may be included within servers 205.

Figure 3:
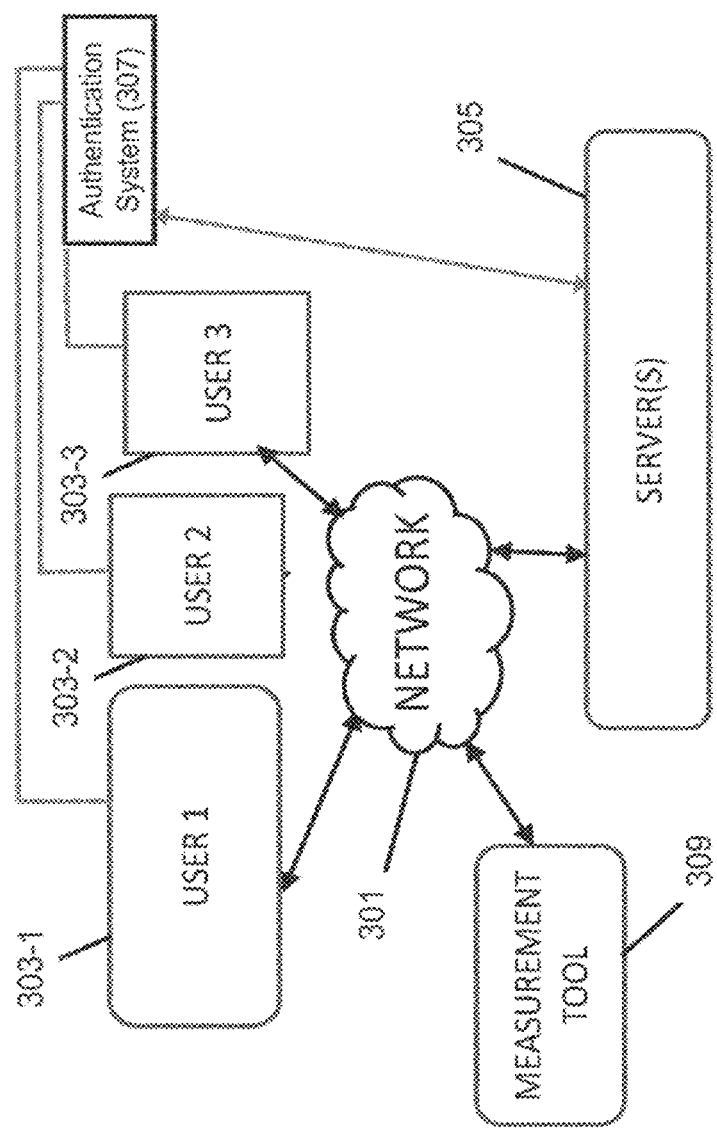
FIG. 3 is a block diagram of another exemplary network environment suitable for a distributed implementation of the solutions platform, in accordance with an embodiment of the disclosure.

FIG. 3 is a block diagram of another exemplary network environment suitable for a distributed implementation of the solutions platform. The description provided herein in connection with the features and functionalities of components of FIG. 2 also apply to equivalent components of FIG. 3. The exemplary network environment can include one or more servers 305 that are configured to communicates with user devices 303-1 (1=1, 2, and 3) and a measurement tool 309 via a network 301. The measurement tool can be, but is not limited to, one or more physiological or monitoring components and/or one or more components configured for cognitive monitoring, assessment, screening, and/or treatment. The solutions platform is configured to provide control to user device 303-1 of user 1 to set the user types and permission levels and access type associated with each other user type in the group, and to specify the source and the type of data to be received from the one or more measurement tools 309. In this example, measurement tool 309 may be configured to transmit (wired or wirelessly) data or other information to the solutions platform, or may not be coupled to the solutions platform (but rather, the solutions platform is configured to display measurement fields that request input of the data resulting from the measurements of the measurement tool). For example, user device 303-1 can be used to send control signals that set a first set of permission levels and access levels of user 1, a second (more limited) set of permission levels and access levels for user type 2 associated with user device 303-2, and a third (restricted) set of permission levels and access levels for user type 3 associated with user device 303-3. In order to gain access to the exemplary solutions platform, each user is required to be authenticated via an authentication system 307. On receipt at the server(s) 305 of the authentication of a given user type, the server 305 is configured to grant access to the user type to the hosted applications and/or content that are allowed based on the permission levels set by the control signals from user device 303-1.

While not shown in FIG. 3, the network environment may also include one or more databases associated with server 305. In various examples, the one or more databases can be used to store user identifying information, the health information of one or more individual(s), data indicative of the measures collected from the user(s) (including behavior measures and/or symptom measures), data from the one or more measurement tools 309, or other data described herein; while the server(s) 305 can store analytics engines and/or report generating engines which can implement one or more of the processes described herein. The exemplary analytics engine can be used to apply an exemplary classifier model to the data received in response to the measurement fields, to provide the analysis results used at least in part to generate the enhanced analysis report.

An electronic display device (not shown) associated with user device 303-1 may display a rendered graphical user interface (GUI) to a user as described herein. Once the display device receives instructions from the server 305, the GUI may be rendered to allow an individual to interact with the servers to implement processes described herein, including defining the other user types, setting the permission levels and access levels of the defined user types, displaying fields for entering measurement data, specifying the source and the type of data to be received from the one or more measurement tools 309, and receiving the measurement data, as described herein.

Figure 4:
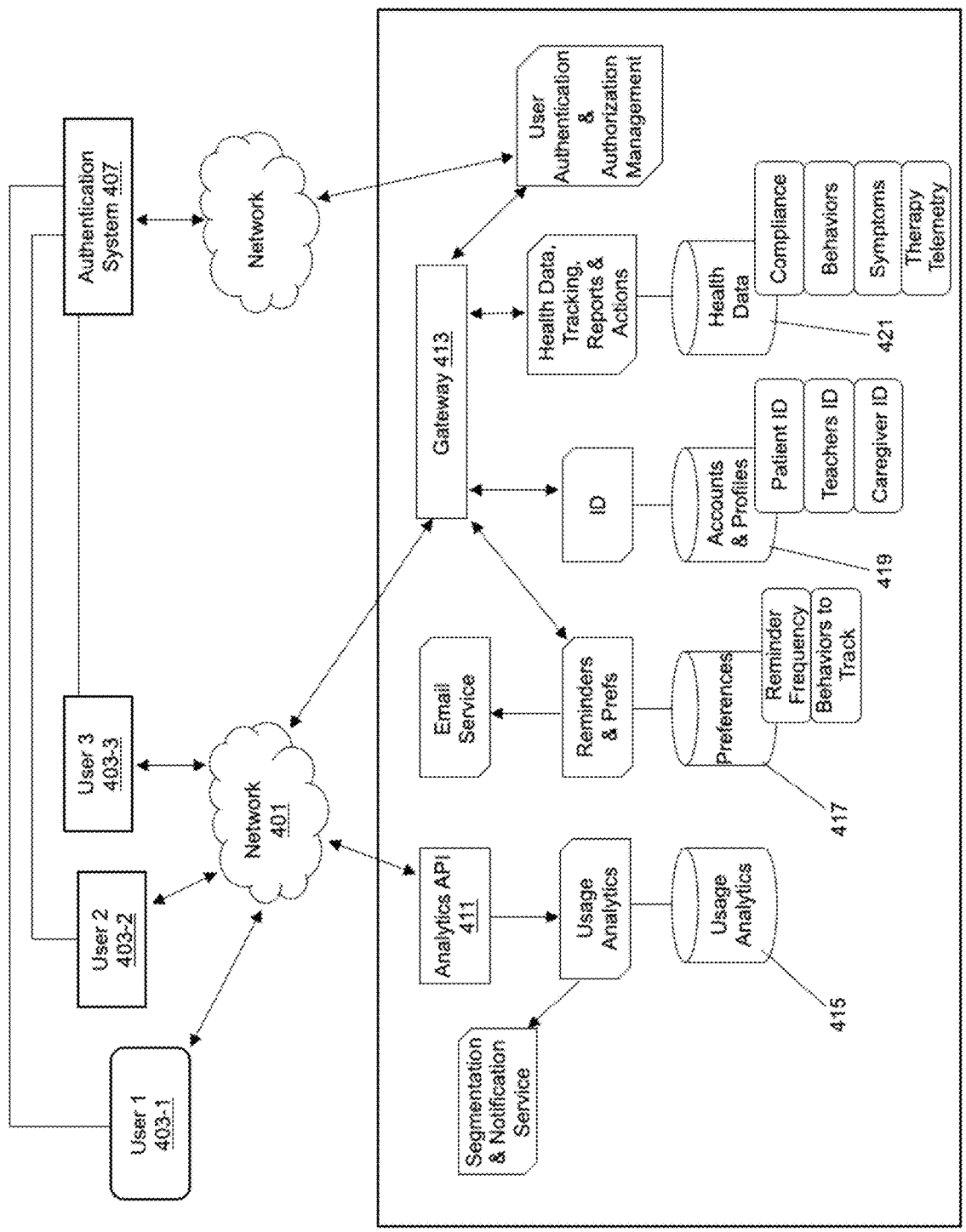
FIG. 4 is a block diagram of yet another exemplary network environment suitable for a distributed implementation of the solutions platform, in accordance with an embodiment of the disclosure.

FIG. 4 is a block diagram of yet another exemplary network environment suitable for a distributed implementation of the solutions platform. The description provided herein in connection with the features and functionalities of components of FIGS. 2 and 3 also apply to equivalent components of FIG. 4. The exemplary network environment can include one or more servers (configured to function as analytics engines 411 and a gateway 413) and databases 415-421 that are configured to communicates with user devices 403-1 (I=1, 2, and 3) via a network 401. One or more measurement tools (not shown), such as but is not limited to, one or more physiological or monitoring components and/or one or more components configured for cognitive monitoring, assessment, screening, and/or treatment, may communicate data via a network 401 to the one or more servers (configured to function as analytics engines 411 and a gateway 413) and databases 415-421. In this example, the measurement tool may be configured to transmit (wired or wirelessly) data or other information solutions platform is configured to display measurement fields that request input of the data resulting from the measurements of the measurement tool).

The exemplary solutions platform is configured to provide control to user device 403-1 of user 1 to set the user types and permission levels and access type associated with each other user type in the group, and to specify the source and the type of data to be received from the one or more measurement tools. For example, user device 403-1 can be used to send control signals that set a first set of permission levels and access levels of user 1, a second (more limited) set of permission levels and access levels for user type 2 associated with user device 403-2, and a third (restricted) set of permission levels and access levels for user type 3 associated with user device 403-3. In order to gain access to the exemplary solutions platform, each user is required to be authenticated via an authentication system 407. On receipt at the server(s) (configured to function as analytics engines 411 and a gateway 413) of the authentication of a given user type, the server(s) (configured to function as analytics engines 411 and a gateway 413) is configured to grant access to the user type to the hosted applications and/or content that are allowed based on the permission levels set by the control signals from user device 403-1.

As shown in FIG. 4, the network environment includes one or more databases 415-421 associated with the one or more servers (configured to function as analytics engines 411 and a gateway 413). In various examples, the one or more databases 415-421 can be used to store user identifying information, the health information of one or more individual(s), data indicative of the measures collected from the user(s) (including behavior measures and/or symptom measures), data from the one or more measurement tools, or other data described herein; while the server(s) (configured to function as analytics engines 411 and a gateway 413) can store analytics engines and/or report generating engines which can implement one or more of the processes described herein. In the non-limiting example of FIG. 4, database 415 is used to store usage analytics (generated using the analytics engine); database 417 is used to store the preferences set using control signals from the user 1 device (such as but not limited to reminder frequency and the specified behaviors to be quantified and tracked); database 419 is used to store accounts and profile information for each of the users and user types identified based on control signals from the user device 1 (such as but not limited to data indicative of identifying ID of the individual's teacher(s), and the individual's caregivers); and database 421 is used to store data indicative of health information (such as but not limited to data indicative of the individual's behavior measures, symptom measures, compliance level, and other measurements (including treatment telemetry)).

The exemplary analytics engine 411 can be used to apply an exemplary classifier model to the data received in response to the measurement fields, to provide the analysis results used at least in part to generate the enhanced analysis report.

As shown in FIG. 4, the exemplary gateway 413 controls the communications between the network 401 and database 417 (preferences set using control signals from the user 1 device), database 419 (which includes identifying information) and database 421 (which includes health data). The exemplary gateway 413 also communicates with the authentication system 407. Accordingly, based on the control signals from the user device 1 (403-1), the gateway 413 is configured to control the permissions and access levels of each user type, to determine the authentication state of any user, and to control the granting of access of an authenticated user. The gateway 413 is also configured to apply an encryption protocol (including TLS version 1.x, implementing (as a non-limiting example) a Cipher of AES256 encryption protocol) to encrypt or decrypt data being exchanged between the user devices, the servers, and the databases. The encrypted data resulting from the application of an encryption protocol can be shared via gateway 413 across the distributed environment more securely, thereby providing additional security for the secured collection, analysis, and sharing of data across multiple distributed data assets (including across multiple distributed platforms). The gateway 413 also can be configured, based on the control signals from the user device 1 (403-1), to control and verify the access levels of each user that attempts to exchange data over network 401.

An electronic display device (not shown) associated with user device 403-1 may display a rendered graphical user interface (GUI) to a user as described herein. Once the display device receives instructions from the server(s) (configured to function as analytics engines 411 and a gateway 413), the GUI may be rendered to allow an individual to interact with the servers to implement processes described herein, including defining the other user types, setting the permission levels and access levels of the defined user types, displaying fields for entering measurement data, specifying the source and the type of data to be received from the one or more measurement tools 409, and receiving the measurement data, as described herein.

Figure 5A:
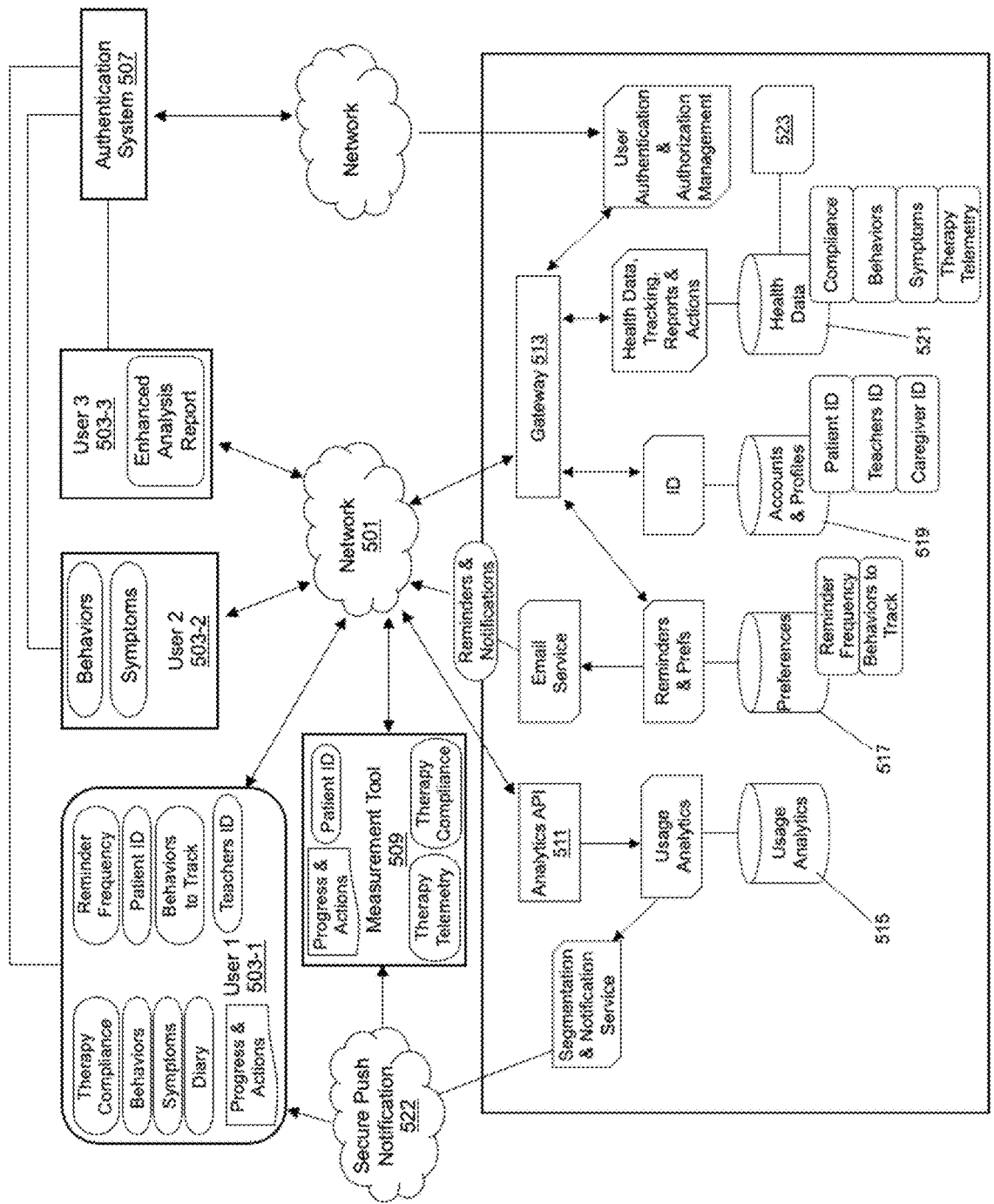
FIG. 5A and FIG. 5B are block diagram of other exemplary network environments suitable for distributed implementations of the solutions platform, in accordance with embodiments of the disclosure.

FIG. 5A is a block diagram of yet another exemplary network environment suitable for a distributed implementation of the solutions platform. The description provided herein in connection with the features and functionalities of components of FIGS. 2, 3, and 4 also apply to equivalent components of FIG. 5A The exemplary network environment can include one or more servers (configured to function as analytics engines 511 and a gateway 513) and databases 515-521 that are configured to communicates with user devices 503-1 (I=1, 2, and 3) via a network 501. One or more measurement tools 509, such as but is not limited to, one or more physiological or monitoring components and/or one or more components configured for cognitive monitoring, assessment, screening, and/or treatment, may communicate data via a network 501 to the one or more servers (configured to function as analytics engines 511 and a gateway 513) and databases 515-521. In this example, measurement tool 509 may be configured to transmit (wired or wirelessly) data or other information to the solutions platform, or may not be coupled to the solutions platform (but rather, the solutions platform is configured to display measurement fields that request input of the data resulting from the measurements of the measurement tool). As shown in the non-limiting example of FIG. 5A, an analysis engine 523 running a classifier model may be used to analyze the data in database 521. As a non-limiting example, analysis engine 523 may be configured to implement a machine learning tool.

The exemplary solutions platform is configured to provide control to user device 503-1 of user 1 to set the user types and permission levels and access type associated with each other user type in the group, and to specify the source and the type of data to be received from the one or more measurement tools 509. For example, user device 503-1 can be used to send control signals that set a first set of permission levels and access levels of user 1, a second (more limited) set of permission levels and access levels for user type 2 associated with user device 503-2, and a third (restricted) set of permission levels and access levels for user type 3 associated with user device 503-3. In order to gain access to the exemplary solutions platform, each user is required to be authenticated via an authentication system 507. On receipt at the authentication of a given user type, the server(s) (configured to function as analytics engines 511 and a gateway 513) is configured to grant access to the user type to the hosted applications and/or content that are allowed based on the permission levels set by the control signals from user device 503-1.

The exemplary network environment is configured to receive and transmit data received from different types of user devices, including user devices 503-1, based on control signals from user device 503-1. For example, the control signals from user device user device 503-1 can provide identifying data of the other allowed user types (such as but not limited to patient ID, teacher ID, and caregiver ID), the permission and access levels restrictions for each user type, reminder frequencies, and the type of behaviors to be measured by each user type. In this non-limiting example, the control signal specifies that user type 2 is permitted to provide only data indicative of the behavior measures and symptom measures for the individual. In this example, the control signals from user device 1 can cause the gateway servers to assign the classification of user type 2 only to select teachers and/or select other caregivers, thereby causing the gateway to provide instructions for the user device 503-2 to display to (or otherwise provide) the allowed measurement fields to the select teachers and/or select other caregivers and to receive only the data indicative of the behavior measures and symptom measures for the individual in response to the measurement field provided at the user devices 503-2. In this non-limiting example, the control signal also specifies that user type 3 is permitted only to receive the enhanced analysis report(s) that is generated based at least in part on an analysis engine applied to the date from the measurement fields provided to the user devices 503-1 and 503-2, and other data provided at user device 503-1. In this example, the control signals from user device 1 can cause the gateway servers to assign the classification of user type 3 only to select caregivers (including select healthcare provider), thereby causing the gateway to allow the select teachers and/or select other caregivers to provide only the data indicative of the behavior measures and symptom measures for the individual in response to the measurement field provided at the user devices 503-2.

The exemplary analytics engine 511 can be used to apply an exemplary classifier model to the data received in response to the measurement fields, to provide the analysis results used at least in part to generate the enhanced analysis report.

As shown in FIG. 5A, the measurement tool can be used to provide data indicative of the individual's results from interacting with the measurement tool, including treatment (or therapy) telemetry and/or compliance. As described hereinabove, the measurement tool can be configured for cognitive monitoring, assessment, screening, and/or treatment.

As shown in FIG. 5A, the network environment includes one or more databases 515-521 associated with the one or more servers (configured to function as analytics engines 511 and a gateway 513). In various examples, the one or more databases 515-521 can be used to store user identifying information, the health information of one or more individual(s), data indicative of the measures collected from the user(s) (including behavior measures and/or symptom measures), data from the one or more measurement tools 509, or other data described herein; while the server(s) (configured to function as analytics engines 511 and a gateway 513) can store analytics engines and/or report generating engines which can implement one or more of the processes described herein. In the non-limiting example of FIG. 5A, database 515 is used to store usage analytics (generated using the analytics engine); database 517 is used to store the preferences set using control signals from the user 1 device (such as but not limited to reminder frequency and the specified behaviors to be quantified and tracked); database 519 is used to store accounts and profile information for each of the users and user types identified based on control signals from the user device 1 (such as but not limited to data indicative of identifying information (ID) of the individual whose health information is being analyzed (patient ID), the ID of the individual's teacher(s), and the individual's caregivers); and database 521 is used to store data indicative of health information (such as but not limited to data indicative of the individual's behavior measures, symptom measures, compliance level, and other measurements (including treatment telemetry)).

The exemplary gateway 513 controls the communications between the network 501 and database 517 (preferences set using control signals from the user 1 device), database 519 (which includes identifying information) and database 521 (which includes health data). The exemplary gateway 513 also communicates with the authentication system 507. Accordingly, based on the control signals from the user device 1 (503-1), the gateway 513 is configured to control the permissions and access levels of each user type, to determine the authentication state of any user, and to control the granting of access of an authenticated user. The gateway implementing (as a non-limiting example) a Cipher of AES256 encryption protocol) to encrypt or decrypt data being exchanged between the user devices, the servers, and the databases. The encrypted data resulting from the application of an encryption protocol can be shared via gateway 513 across the distributed environment more securely, thereby providing additional security for the secured collection, analysis, and sharing of data across multiple distributed data assets (including across multiple distributed platforms). The gateway 513 also can be configured, based on the control signals from the user device 1 (503-1), to control and verify the access levels of each user that attempts to exchange data over network 501.

In another example of FIG. 5A, the communication between the one or more servers (including a server configured to execute the analytics engine) and the user device 503-1 can be through a secure push notification process. In other non-limiting examples, the gateway 513 can be configured to communicate with one or more of user device 503-2 and user device 503-3 through a secure push notification, based on control signals from the user device 503-1.

An electronic display device (not shown) associated with user device 503-1 may display a rendered graphical user interface (GUI) to a user as described herein. Once the display device receives instructions from the server(s) (configured to function as analytics engines 511 and a gateway 513), the GUI may be rendered to allow an individual to interact with the servers to implement processes described herein, including defining the other user types, setting the permission levels and access levels of the defined user types, displaying fields for entering measurement data, specifying the source and the type of data to be received from the one or more measurement tools 509, and receiving the measurement data, as described herein.

In some examples, the communications between the one or more server and the user devices (including user 1, user 2, or user 3) can be effected using secure links that are set up over an email service.

In any example described herein, the communications between the one or more server and the user devices (including user 1, user 2, or user 3) can be effected via a secure push notification set up. For example, the user 1 user device can be used to set preferences for the reminders and notifications that go to user 2 types (including teachers and healthcare providers) via a secure push notification to a mobile device.

Figure 5B:
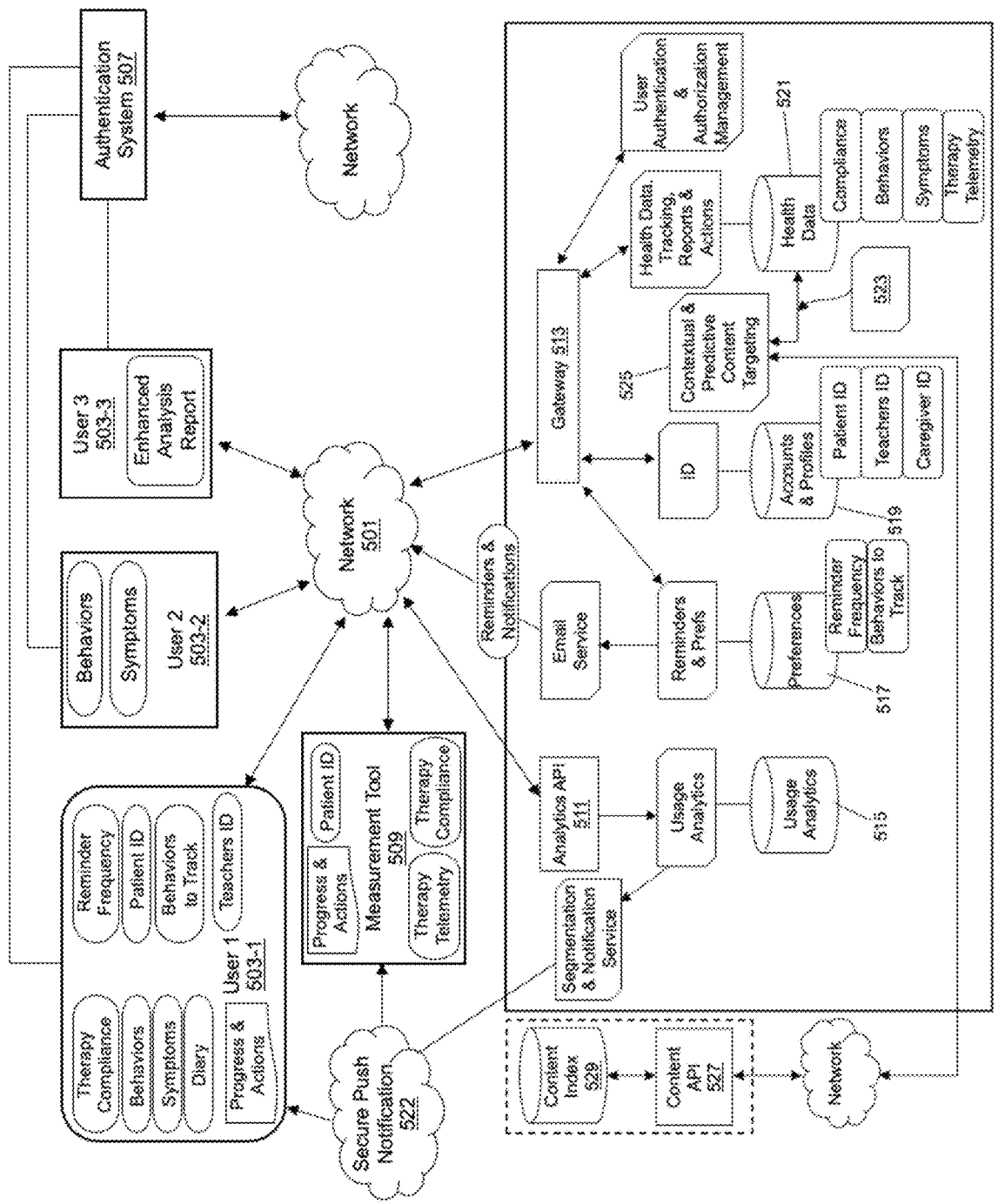

FIG. 5B is a block diagram of yet another exemplary network environment suitable for a distributed implementation of the solutions platform. The description provided herein in connection with the features and functionalities of components of FIGS. 2, 3, 4, and 5A also apply to equivalent components of FIG. 5B, but with the added component of a content module 525 that is in communication with gateway 513, database 521, and analysis engine 523. The content module 525 is configured to generate one or more content queries based at least in part on the analysis results from the (such as but not limited to behavior assessment data), thereby providing for contextual and predictive content targeting.

Exemplary inputs to the content module 525 are audience (e.g., age or age range, user), context (time, activity, location), domain (symptom, behavior, impairment), and rating(s). The content module 525 may include a content targeting engine configured to implement a rules engine for, e.g., converting raw telemetry from tracking or treatments into the contextual and domain inputs. The predictive content targeting may be based on machine learning via patterns or predicted trends in combination with one or more inputs (i.e., audience, context, domain, and/or ratings inputs). Content engagement may be tracked based on content that was viewed, read, and/or favored by the users, as a feedback loop for future content generation.

As an example of predictive content modeling, users may be designated to fall into defined categories called "profiles" based on a variety of dimensions, e.g., app usage, tracking data, environment, and role. Content may have meta data "tags" associated with a taxonomy that matches the data collected. Algorithms may determine what content to show to the user, based upon the profile of the user.

As a non-limiting example, the content module 525 can be configured to communicate the one or more content queries to one or more content libraries 527 having APIs and which communicate with at least one content index 529. The queries can be constructed based on the results of the analysis from the analysis engine 523 to identify educational, informational, clinical, behavioral, or other type of content to output to the user of the system and/or to the individual whose symptom and behaviors are being measured. The content queries can be targeted to identify content that may assist the individual improve a scoring of one or more symptoms measured based on the individual's condition or to improve and/or modify one or more behaviors exhibited by the individual and which are being measured based on the condition.

As non-limiting examples, the content library can be a national resource database, a medical society database, a professional society database, or a privately-curated library, or any other source that can be queried to provide relevant content. For example, where the condition is ADHD, the content library can be affiliated with the CHADD national resource (a recognized authority on ADHD).

As a non-limiting example, for an individual having ADHD, one or more symptoms of ADHD and one or more associated behaviors are analyzed to determine one or more of: (i) a pace of response of the individual to a treatment, (ii) a status of the condition, (iii) an efficacy of medication at controlling a behavior, or (iv) an efficacy of medication at addressing a symptom of the condition. The queries generated based on the analysis can be targeted to identify content that may assist the individual and/or at least one caregiver of the individual to modify (including to improve) a scoring on at least one symptom measure or to modify (including to improve) a scoring on at least one behavior measure. In this example, the content query may be targeted to identify content that may assist an individual hone homework or test-taking skills where the analysis module shows based on the analysis that that individual's capabilities are not improving with the other treatment the individual is receiving.

As another non-limiting example, for an individual having major depressive disorder (MDD), one or more symptoms of MDD and one or more associated behaviors are analyzed to determine one or more of: (i) a pace of response of the individual to a treatment, (ii) a status of the condition, (iii) an efficacy of medication at controlling a behavior, or (iv) an efficacy of medication at addressing a symptom of the condition. The queries generated based on the analysis can be targeted to identify content that may assist the individual and/or at least one caregiver of the individual to modify (including to improve) a scoring on at least one symptom measure or to modify (including to improve) a scoring on at least one behavior measure. In this example, the content query may be targeted to identify content that may assist an individual address a cognitive deficit attendant to the MDD, where the analysis module shows based on the analysis that that individual's cognitive abilities are not improving with the other treatment the individual is receiving.

Figure 6:
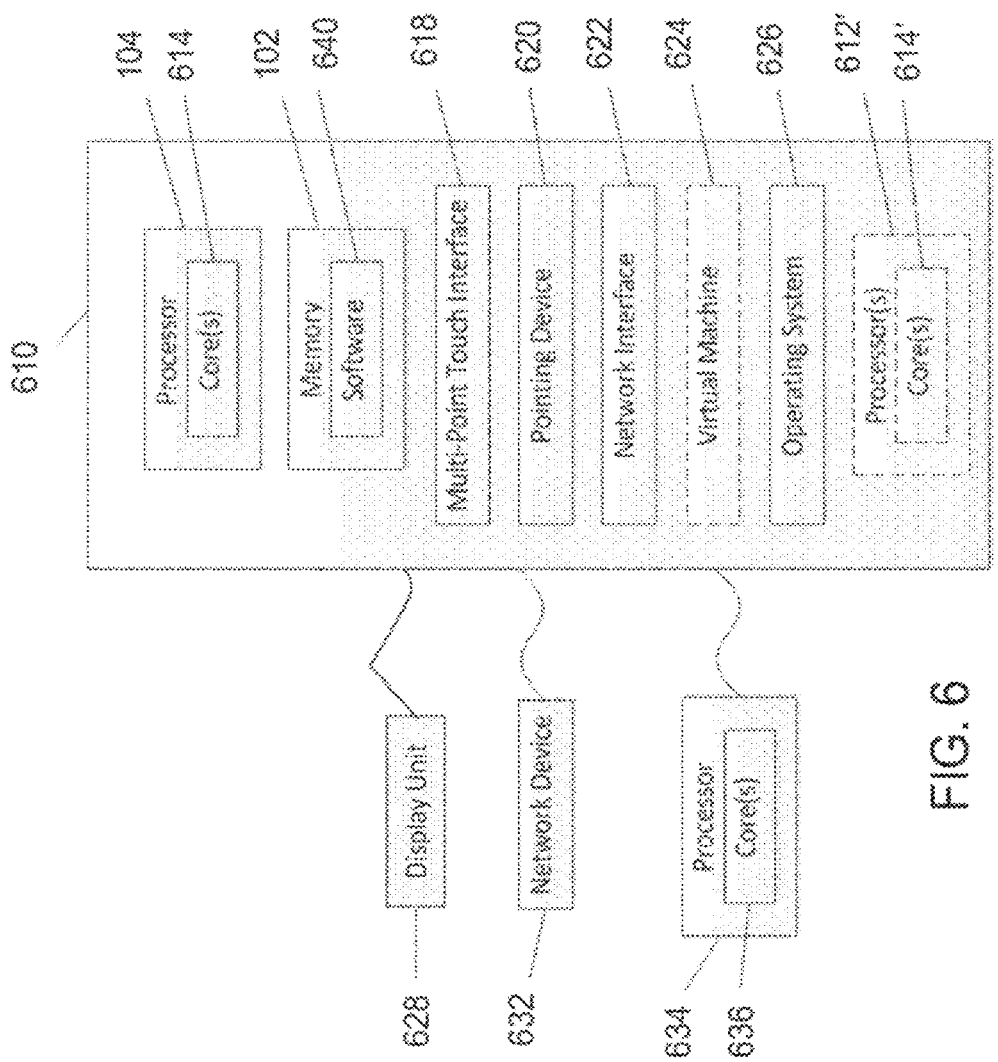
FIG. 6 is a block diagram of an exemplary computing device that can be used as a computing component to perform one or more of the procedures described herein, including in connection with FIGS. 1-4.

As a specific example of content targeting, a care giver may select and indicate on a behavior tracking form that his/her child "not at all" and "quite a bit" holds one of four specific behaviors over the last seven days. The system may show the parent, e.g., on user device 1, health tips that may help the parent at home and at school in the following use cases:
 1. Specific parent facing home-morning routine
 2. Specific parent facing home-homework
 3. Specific parent facing school
 4. Generic parent home
 5. Generic parent school FIG. 6 is a block diagram of an exemplary computing device 610 that can be used as a computing component to perform one or more of the procedures described herein, including in connection with FIGS. 1-4. In any example herein, computing device 610 can be configured as a console that receives user input to implement the computing component, including to perform one or more of the analyses and/or to generate the one or more enhanced analysis reports. For clarity, FIG. 6 also refers back to and provides greater detail regarding various elements of the exemplary system of FIG. 1. The computing device 610 can include one or more non-transitory computer-readable media for storing one or more computer-executable instructions or software for implementing examples. The non-transitory computer-readable media can include, but are not limited to, one or more types of hardware memory, non-transitory tangible media (for example, one or more magnetic storage disks, one or more optical disks, one or more flash drives), and the like. For example, memory 102 included in the computing device 610 can store computer-readable and computer-executable instructions or software for performing the operations disclosed herein. For example, the memory 102 can store a software application 650 which is configured to perform various of the disclosed operations (e.g., analyze data received in connection with the one or more measurement fields, applying an exemplary classifier model to the data, performing a computation to analyze the data, or generate the enhanced analysis reports). The computing device 610 also includes configurable and/or programmable processor 104 and an associated core 614, and optionally, 612' and associated core(s) 614' (for example, in the case of computational devices having multiple processors/cores), for executing computer-readable and computer-executable instructions or software stored in the memory 102 and other programs for controlling system hardware. Processor 104 and processor(s) 612' can each be a single core processor or multiple core (614 and 614') processor.

Virtualization can be employed in the computing device 610 so that infrastructure and resources in the console can be shared dynamically. A virtual machine 624 can be provided to handle a process running on multiple processors so that the process appears to be using only one computing resource rather than multiple computing resources. Multiple virtual machines can also be used with one processor.

Memory 102 can include a computational device memory or random access memory, such as but not limited to DRAM, SRAM, EDO RAM, and the like. Memory 102 can include a non-volatile memory, such as but not limited to a hard-disk or flash memory. Memory 102 can include other types of memory as well, or combinations thereof.

In a non-limiting example, the memory 102 and at least one processing unit 104 can be components of a peripheral device, such as but not limited to a dongle (including an adapter) or other peripheral hardware. The exemplary peripheral device can be programmed to communicate with or otherwise couple to a primary computing device, to provide the functionality of any of the exemplary measurement tools, apply an exemplary classifier model, and implement any of the exemplary analyses (including the associated computations) described herein. In some examples, the peripheral device can be programmed to directly communicate with or otherwise couple to the primary computing device (such as but not limited to via a USB or HDMI input), or indirectly via a cable (including a coaxial cable), copper wire (including, but not limited to, PSTN, ISDN, and DSL), optical fiber, or other connector or adapter. In another example, the peripheral device can be programmed to communicate wirelessly (such as but not limited to Wi-Fi or Bluetooth®) with primary computing device. The exemplary primary computing device can be a smartphone (such as but not limited to an iPhone®, a BlackBerry®, or an Android™-based smartphone), a television, a workstation, a desktop computer, a laptop, a tablet, a slate, an electronic-reader (e-reader), a digital assistant, or other electronic reader or hand-held, portable, or wearable computing device, or any other equivalent device, an Xbox®, a Wii®, or other equivalent form of computing device.

A user can interact with the computing device 610 through a visual display unit 628, such as a computer monitor, which can display one or more rendered graphical user interfaces 630 that can be provided in accordance with exemplary systems and methods. The computing device 610 can include other I/O devices for receiving input from a user, for example, a keyboard or any suitable multi-point touch interface 618, a pointing device 620 (e.g., a mouse), a camera or other image recording device, a microphone or other sound recording device, an accelerometer, a gyroscope, a sensor for tactile, vibrational, or auditory signal, and/or at least one actuator. The keyboard 618 and the pointing device 620 can be coupled to the visual display unit 628. The computing device 610 can include other suitable conventional I/O peripherals.

The computing device 610 can also include one or more storage devices 634 (including a single core processor or multiple core processor 636), such as a hard-drive, CD-ROM, or other computer readable media, for storing data and computer-readable instructions and/or software that perform operations disclosed herein. Exemplary storage device 634 (including a single core processor or multiple core processor 636) can also store one or more databases for storing any suitable information required to implement exemplary systems and methods. The databases can be updated manually or automatically at any suitable time to add, delete, and/or update one or more items in the databases.

The computing device 610 can include a network interface 622 configured to interface via one or more network devices 632 with one or more networks, for example, Local Area Network (LAN), metropolitan area network (MAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 622 can include a built-in network adapter, network interface card, PCMCIA network card, card bus network adapter, wireless network adapter, USB network adapter, modem or any other device suitable for interfacing the computing device 610 to any type of network capable of communication and performing the operations described herein. Moreover, the computing device 610 can be any computational device, such as a smartphone (such as but not limited to an iPhone®, a BlackBerry®, or an Android™-based smartphone), a television, a workstation, a desktop computer, a server, a laptop, a tablet, a slate, an electronic-reader (e-reader), a digital assistant, or other electronic reader or hand-held, portable, or wearable computing device, or any other equivalent device, an Xbox®, a Wii®, or other equivalent form of computing or telecommunications device that is capable of communication and that has or can be coupled to sufficient processor power and memory capacity to perform the operations described herein. The one or more network devices 632 may communicate using different types of protocols, such as but not limited to WAP (Wireless Application Protocol), TCP/IP (Transmission Control Protocol/Internet Protocol), Net-BEUI (NetBIOS Extended User Interface), or IPX/SPX (Internetwork Packet Exchange/Sequenced Packet Exchange).

The computing device 610 can run any operating system 626, such as any of the versions of the Microsoft® Windows® operating systems, iOS® operating system, ANDROID operating system, the different releases of the Unix and Linux operating systems, any version of the MacOS® for Macintosh computers, any embedded operating system, any real-time operating system, any open source operating system, any proprietary operating system, or any other operating system capable of running on the console and performing the operations described herein. In some examples, the operating system 626 can be run in native mode or emulated mode. In an example, the operating system 626 can be run on one or more cloud machine instances.

Figure 7:
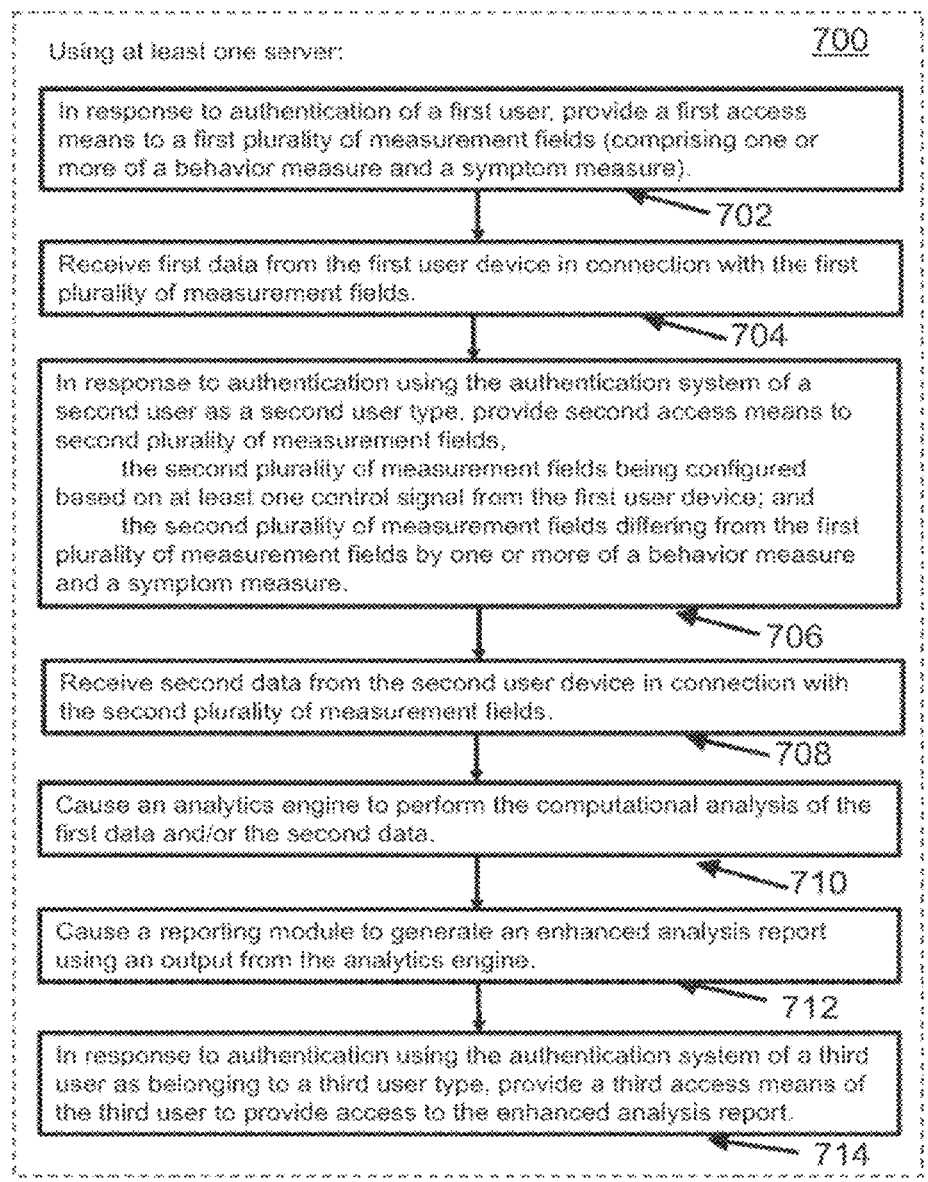
FIG. 7 is a flowchart of an exemplary method that can be implemented using any solutions platform described herein that executes processor-executable instructions using at least one server, in accordance with embodiments of the disclosure.

FIG. 7 shows a flowchart of a non-limiting exemplary method that can be implemented using any solutions platform described herein that executes processor-executable instructions using at least one server. In block 702, in response to authentication of a first user using an authentication system, the server provides a first access means of a first user device to a first plurality of measurement fields, the first plurality of measurement fields comprising one or more of a behavior measure and a symptom measure. In block 704, the server is used to receive first data from the first user device in connection with the first plurality of measurement fields. In block 706, in response to authentication using the authentication system of a second user as belonging to a second user type, the server is used to provide a second access means of measurement fields is configured based on at least one control signal from the first user device, and the second plurality of measurement fields differing from the first plurality of measurement fields by one or more of a behavior measure and a symptom measure. In block 708, the server is used to receive second data from the second user device in connection with the second plurality of measurement fields. In block 710, the server is used to cause an analytics engine to perform the computational analysis of the first data and/or the second data. In block 712, the server is used to cause a reporting module to generate an enhanced analysis report using an output from the analytics engine. In block 714, in response to authentication using the authentication system of a third user as belonging to a third user type, the server is used to provide a third access means of the third user to provide access to the enhanced analysis report.

Figure 8A:
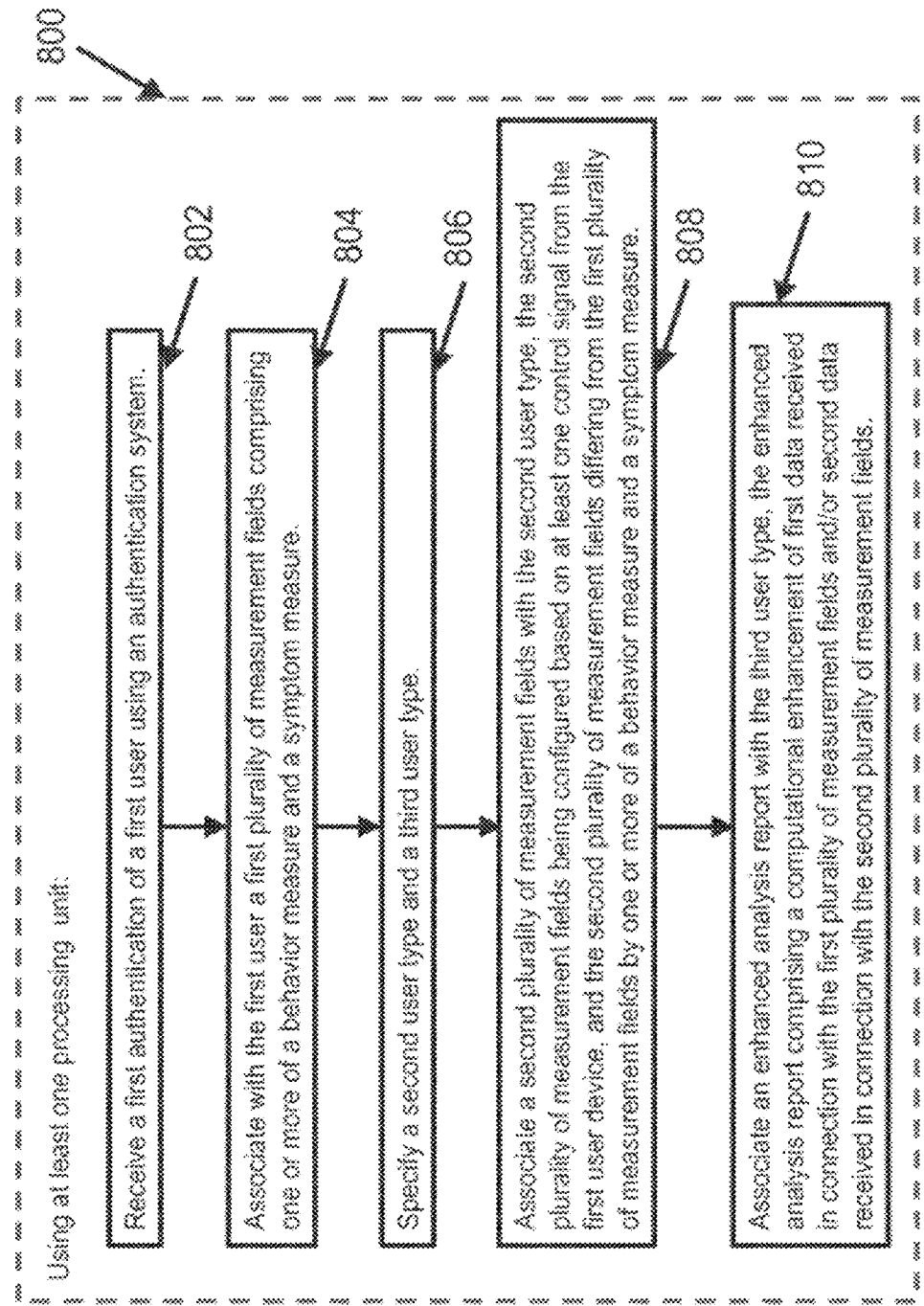
FIGS. 8A-8B are flowcharts of another method that can be implemented using a solutions platform that includes at least one processing unit and at least one server, in accordance with embodiments of the disclosure.
Figure 8B:
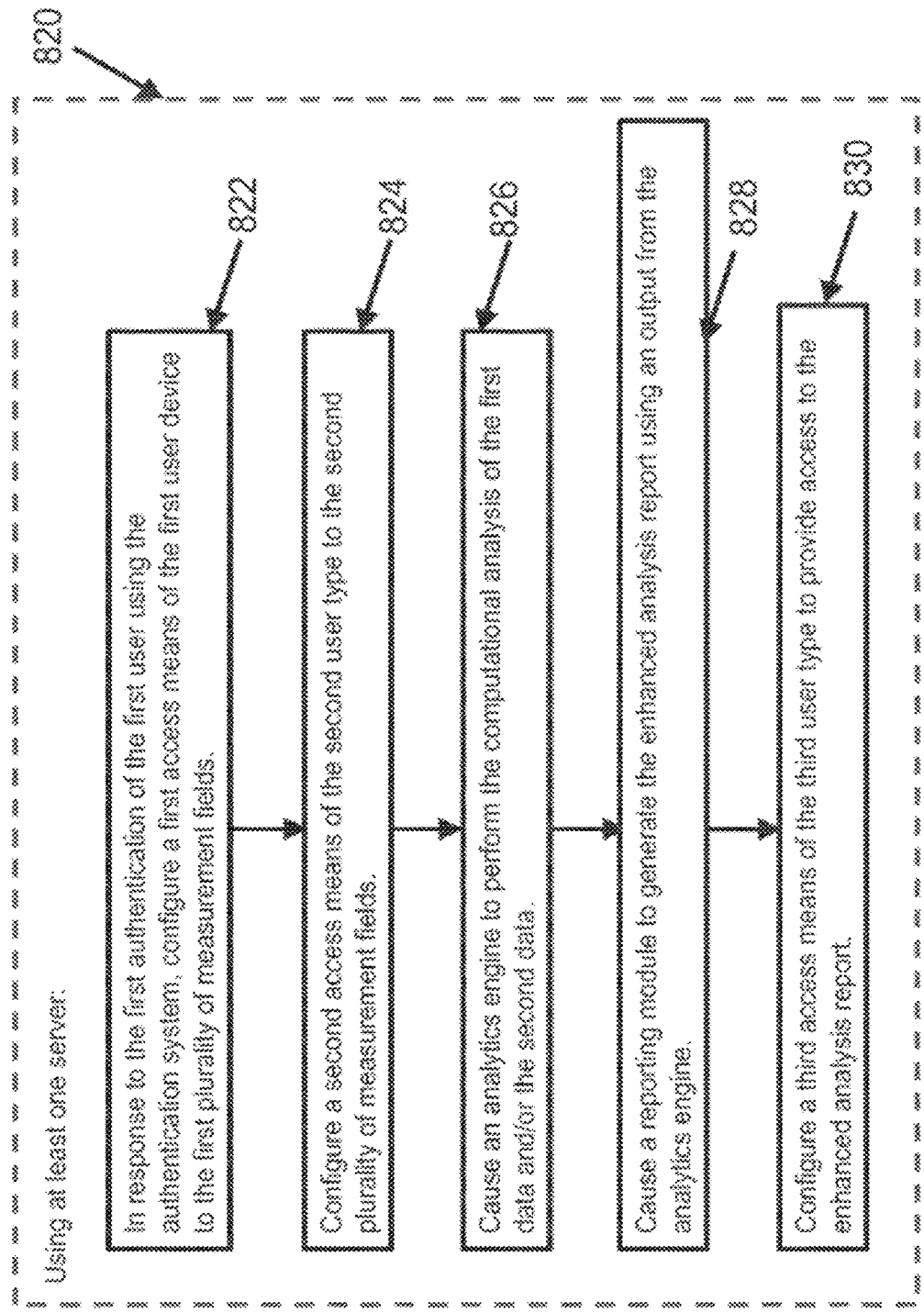

FIGS. 8A-8B show a flowchart of another non-limiting example method that can be implemented using a solutions platform that includes at least one processing unit and at least one server. Operations of the at least one processing unit is described in connection with FIG. 8A as follows. In block 802, the at least one processing unit Is used to receive a first authentication of a first user using an authentication system. In block 804, based on control signals from the first user device, the at least one processing unit is used to associate with the first user a first plurality of measurement fields comprising one or more of a behavior measure and a symptom measure. In block 806, based on control signals from the first user device, the at least one processing unit is used to specify a second user type and a third user type. In block 808, based on control signals from the first user device, the at least one processing unit is used to associate a second plurality of measurement fields with the second user type, the second plurality of measurement fields being configured based on at least one control signal from the first user device, and the second plurality of measurement fields differing from the first plurality of measurement fields by one or more of a behavior measure and a symptom measure. In block 810, based on control signals from the first user device, the at least one processing unit is used to associate an enhanced analysis report with the third user type, the enhanced analysis report comprising a computational enhancement of first data received in connection with the first plurality of measurement fields and/or second data received in connection with the second plurality of measurement fields. Operations of the at least one server is described in connection with FIG. 8B as follows. In block 822, in response to the first authentication of the first user using the authentication system, the at least one server is used to configure a first access means server is used to configure a second access means of the second user type to the second plurality of measurement fields. In block 826, the at least one server is used to cause an analytics engine to perform the computational analysis of the first data and/or the second data. In block 828, the at least one server is used to cause to cause a reporting module to generate the enhanced analysis report using an output from the analytics engine. In block 830, the at least one server is used to configure a third access means of the third user type to provide access to the enhanced analysis report.

Figure 9:
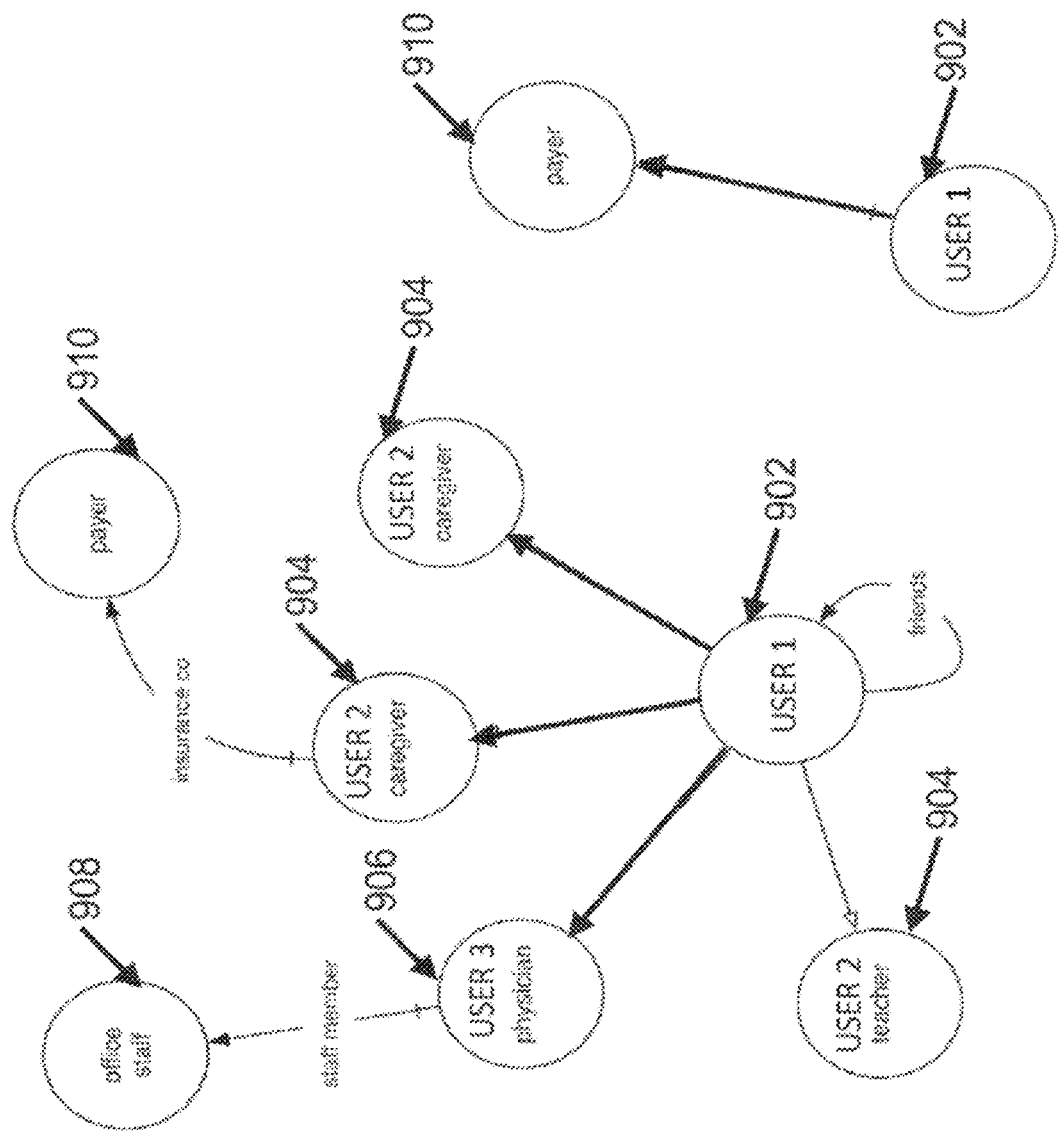
FIG. 9 is a flow diagram showing an example of the types of permissions that can be set on the solutions platform based on the control signals set by a user 1, in accordance with embodiments of the disclosure.

FIG. 9 is a flow diagram showing an example of the types of permissions that can be set on the solutions platform based on the control signals set by user 1 902. As described herein, user 1 may be an individual patient, a group of patients, or someone acting on behalf of the patient (parent, custodian, guardian, or other consented individual), particularly if the patient is a child (including a minor child). Based on the user 1 set controls input, the solutions platform sets the permission levels and access types for those designated as user type 2, which can include caregivers 904 and/or teachers 906, and user type 3, which can include physicians 906. The solutions platform also provides user 1 902 with the capability to set the permissions for any onward transfer of or access to data or other information, or at least a portion of the enhanced analysis report. For example, as shown in FIG. 9, solutions platform also provides user 1 with the capability to configure the permission and access levels for user type 3 906 to allow any onward transfer of or access to data or other information or at least a portion of the enhanced analysis report to one or more others 908, such as but not limited to office staff of the user type 3. As also shown in FIG. 9, solutions platform also provides user 1 with the capability to configure the permission and access levels for user type 2 906 to allow any onward transfer of or access to data or other information or at least a portion of the enhanced analysis report to one or more others 910, such as but not limited to entities for insurance reimbursement (including payers).

As a non-limiting example, the solutions platform can be configured such that a user type 3 (e.g., a physician) can use the data collected and/or the enhanced analysis report to provide remote healthcare. In this example, the permission and access levels set by user 1 can create settings such that the data collected and/or the enhanced analysis report provided to a user type 3 meets requirements for billing and compensation (or other type of reimbursement), healthcare provider activities, and/or diagnoses, and/or patient data or progress reports, and associated metrics and scales, which meet the requirement for reimbursement under a given desired CPT code.

Figure 10:
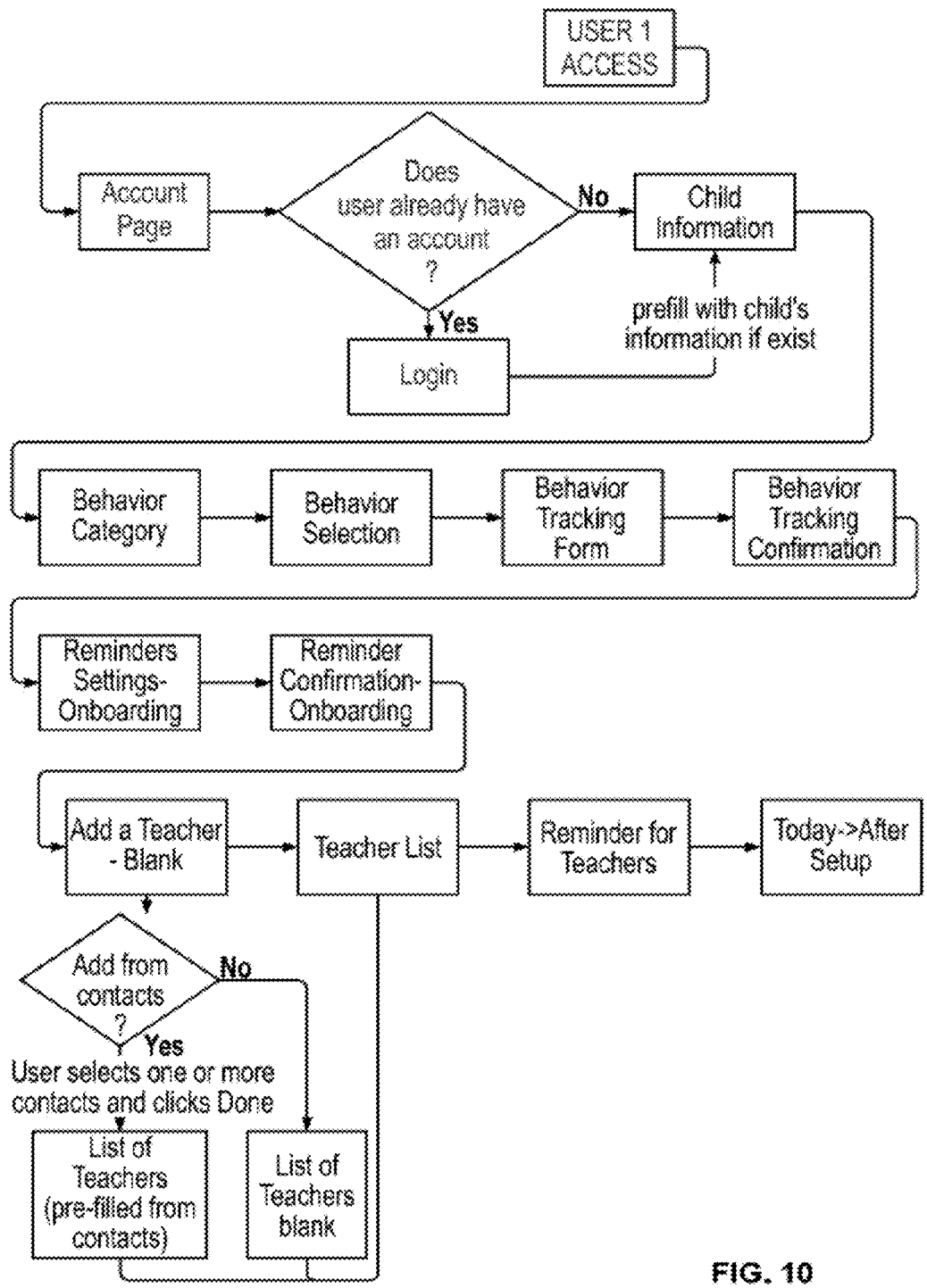
FIG. 10 is a flowchart of an exemplary use of a solutions platform by user 1, including setting permission levels and access types, and indicating the type of data and other information that user 1 is given the capability to enter at a rendered graphical user interface, in accordance with an embodiment of the disclosure.

FIG. 10 shows a flowchart of an exemplary use of the solutions platform by user 1 to set permission levels and access types and the type of data and other information that user 1 is given the capability to enter at rendered graphical user interface(s). In this non-limiting example, user 1 is acting on behalf of a child patient. The solutions platform presents an account page that user 1 can navigate to or otherwise access, such as but not limited to by launching an App on a mobile device, a tablet, or other computing device as described herein. If user 1 has already set up an account, the solutions platform presents user 1 with a rendered graphical user interface that is a login window for user 1's login credentials. If user 1 has no account, the solutions platform presents user 1 with rendered graphical user interfaces to facilitate creation of the account and identification of the individual to be monitored, whether it is user 1 or another individual (such as but not limited to a child, including a minor child). User 1 is provided with the rendered graphical user interfaces to configure the solutions platform by selecting the behavior categories and from that the behavior selections to be measured and quantified, User 1 is also provided with the rendered graphical user interfaces to configure the type of behavior tracking confirmation. The solutions platform also presents user 1 with rendered graphical user interfaces for setting type of reminders, the frequency and manner of sending of the reminders to user 1 and other users (user type 2 and/or user type 3). User 1 is also provided with the rendered graphical user interfaces to specify the identity and permissions and access levels for user types 2 and 3. For example, as shown in the example of FIG. 10, the user type 2 can be provided as a teacher list. User 1 can set the type of reminders, the frequency and manner of sending of the reminders to user type 2. User 1 is also presented rendered graphical user interfaces to retrieve the information for the user types from other user 1 accounts or device settings, such as but not limited to, user 1 contacts.

Figure 11A:
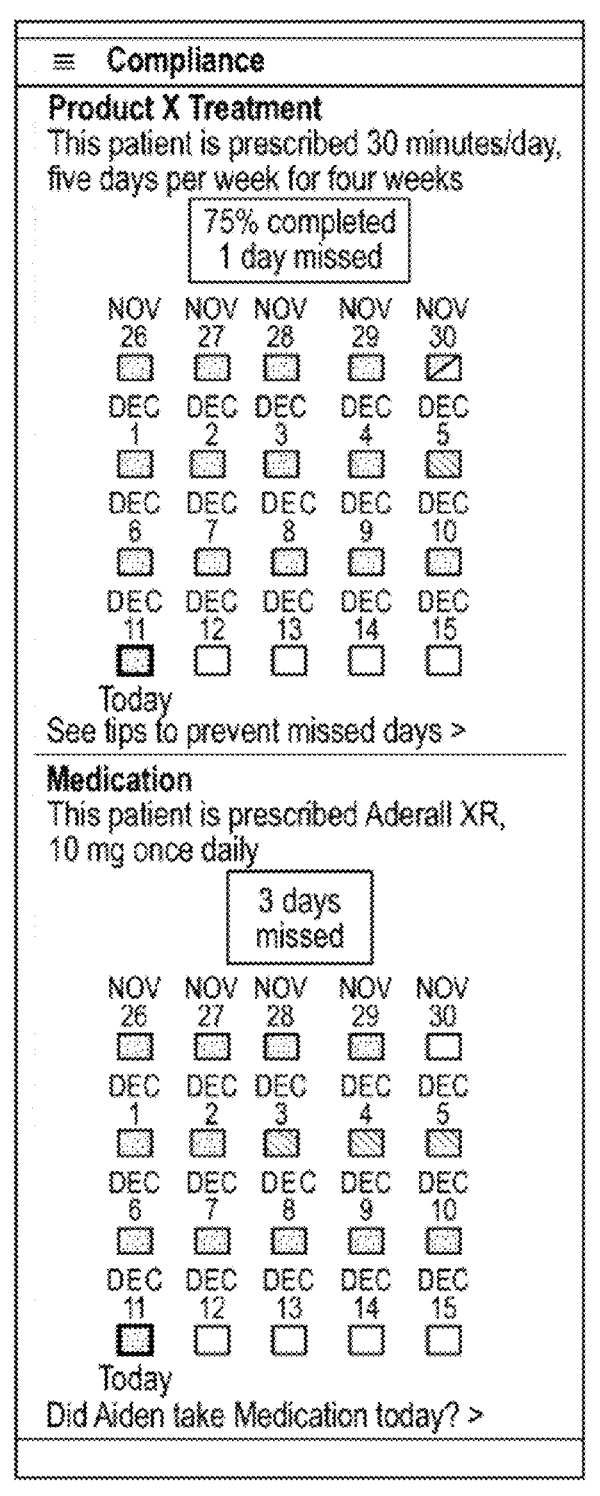
Figure 11B:
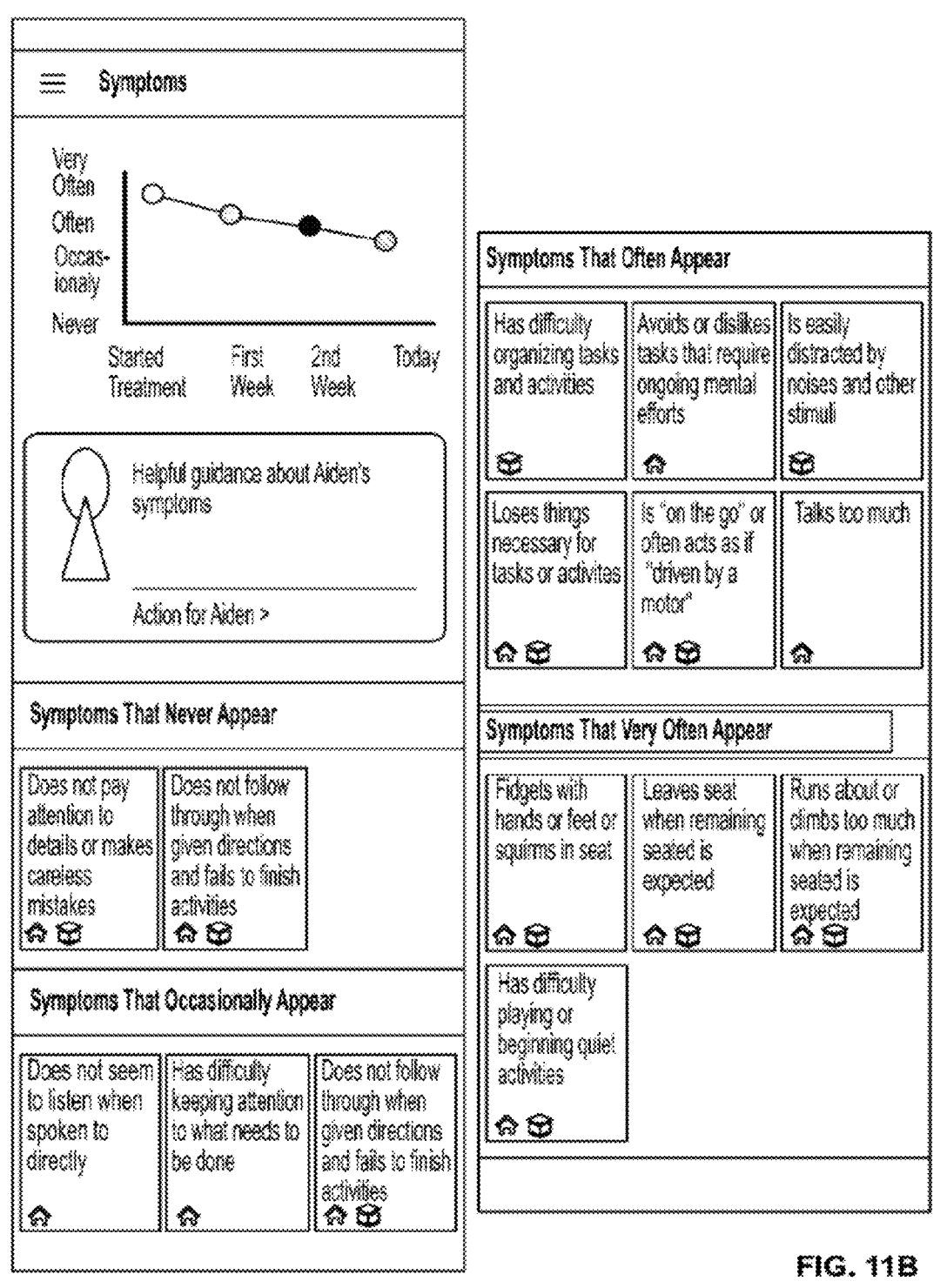
Figure 11C:
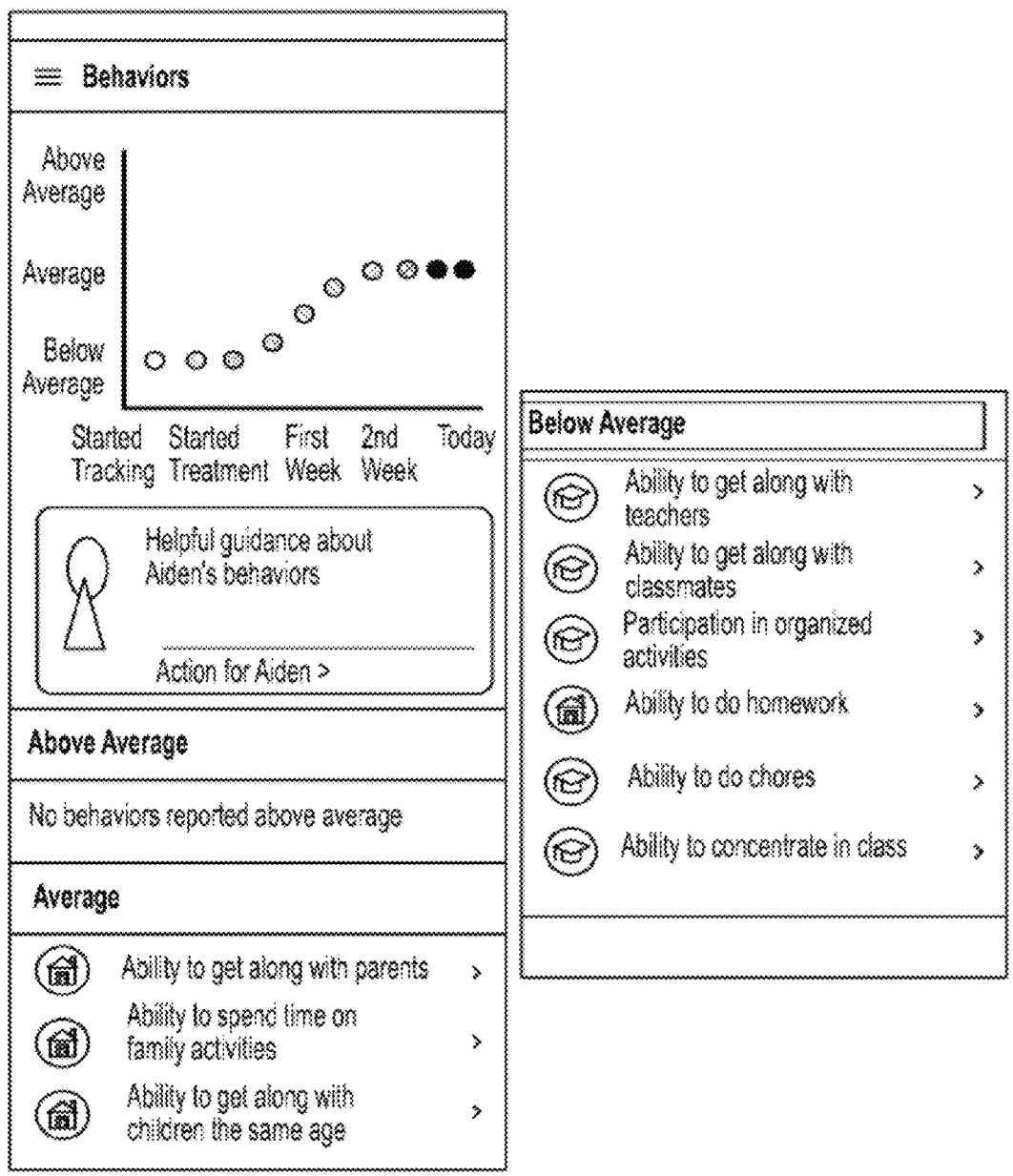

FIGS. 11A-11D show non-limiting examples of the types of data and other information that can be included in an enhanced analysis report. FIG. 11A shows an example of an analysis indicating an individual's compliance with the set requirements of a given treatment or other regimen (including frequency of taking a medication or other treatment, or measures that can be quantified or reported, including an indication of the symptoms that may never appear, symptoms that occasionally appear, or symptoms that appear often or very often, based on a rating scale set in the solutions platform. FIG. 11B also shows the type of computational analysis, visualizations, and the graph plots (e.g., actual and/or projected frequency and/or intensity of symptom appearance over time) that can be generated based on the data collected from user 1, user type 2, and user type 3. FIG. 11C shows an example of the type of behavior measures that can be quantified or reported, including an indication of the behaviors that are quantified as appearing above or below average based on a rating scale set in the solutions platform. FIG. 11C also shows the type of computational analysis, visualizations, and the graph plots (e.g., actual and/or projected frequency and/or intensity of behavior appearance over time) that can be generated based on the data collected from user 1, user type 2, and user type 3. FIG. 1 ID shows an example of a measure from a measurement tool (in this non-limiting example, a cognitive tool) that user 1 configures the solutions platform to collect data from. In this example, the measurement tool shows measures of a cognitive measurement score as a graph plot as compared to data from the individual performance measures (1, 2, 3, and 4) measured by the measurement tool.

Figure 11D:
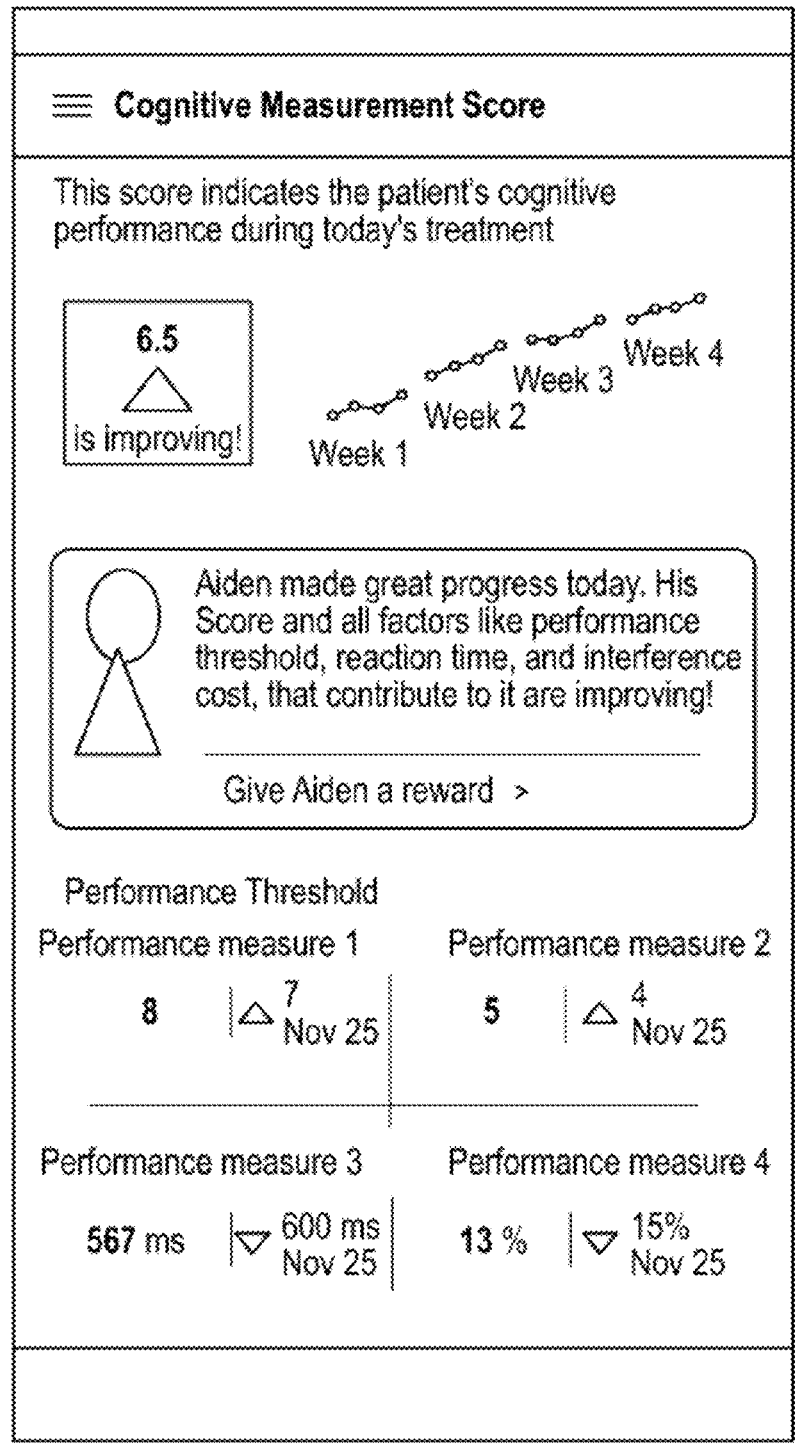

In the non-limiting example of FIG. 11D, performance measure 1 can be a targeting score, performance measure 2 can be a navigation score, and performance measure 3 can be a reaction time, and performance measure 4 can be an interference cost. The graphical user interface is configured to render one or more field(s) to display one or more values corresponding to each of the performance measures, based on the of data collected from the patient's interactions with a cognitive platform, such as but not limited to the examples described in connection with any of FIGS. 13-15H hereinbelow. The graphical user interface is configured to render one or more field(s) to display one or more values computed based on other performance measures. For example, performance measure 4 is value of a performance metric such as an interference cost computed based on the measured values of one or more of performance measure 1, performance measure 2, and/or performance measure 3.

Figure 12A:
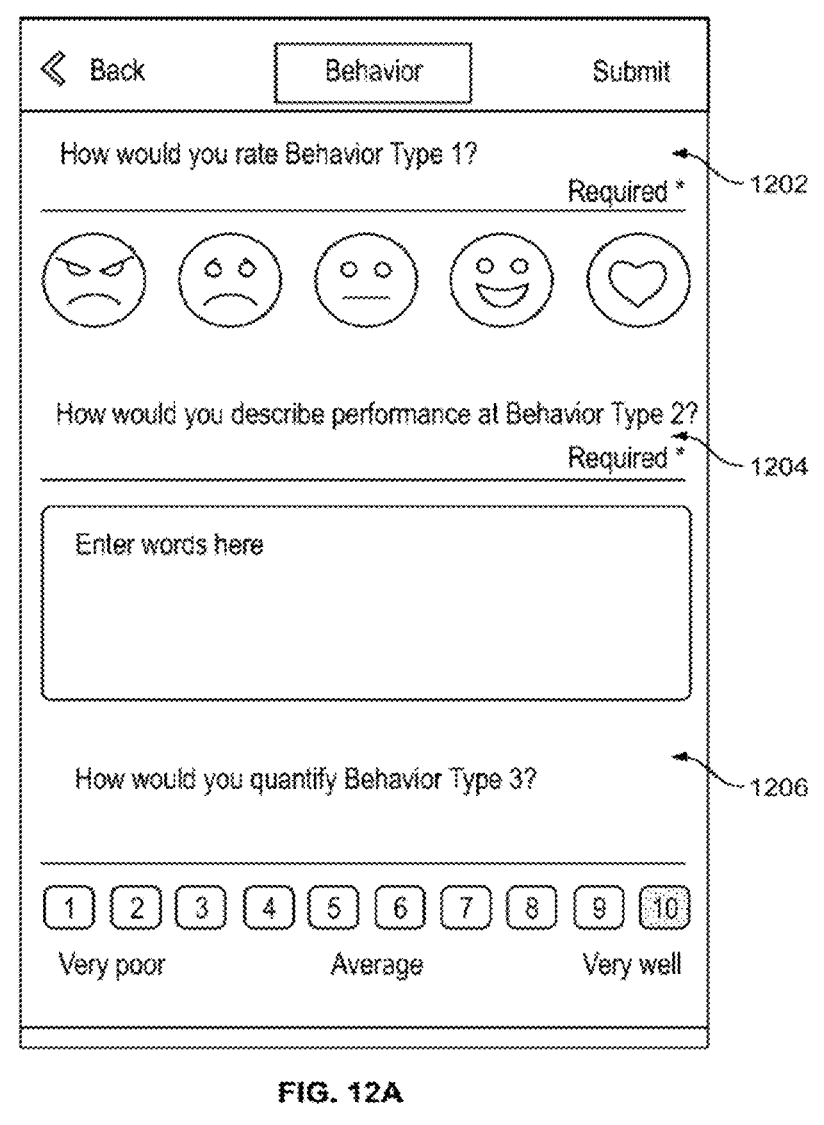
Figure 12B:

FIGS. 12A-12B show non-limiting examples of the graphical user interfaces that the solutions platform can be configured to be rendered to allow user 1, user type 2, and/or user type 3, as applicable, to enter quantifiers of behavior measures (FIG. 12A) or symptom measurement fields (1202, 1204, 1206, 1222, 1224, 1226) that can be rendered for display at the graphical user interface for entry of the ratings and scales by user 1, user type 2, and/or user type 3. FIGS. 12A-12B also show non-limiting examples of the types of rating and quantification scales that can be provided in the measurement fields, such as but not limited to emoji-based rating scales, text-based scales, or numerical quantifier rating scales.

In any example herein, identifying data and information for any of user 1, user type 2, and/or user type 3, can be de-identified prior to use, analysis, and/or transmission. In an example, de-identification can be accomplished by clearing text and any other identifier from the profile, and assigning a user id that is not generated using the identifying information.

In any example herein, identifying data and information for any of user 1, user type 2, and/or user type 3, can be encrypted prior to use, analysis, and/or transmission.

In any example herein, the behavior measure quantifies one or more behavioral parameters for an individual.

In any example herein, the symptom measure quantifies one or more symptoms of a condition of an individual.

In any example herein, the first plurality of measurement fields comprises two or more of a behavior measure, a symptom measure, a medication type designation, a medication compliance quantifier, and a compliance measure.

In any example herein, the at least one server configures the second access means based on at least one control signal from the first user device.

In any example herein, the at least one server configures the third access means based on at least one control signal from the first user device.

In any example herein, the at least one processing unit can be used to receive data indicative of a cognitive measure of an interaction of an individual with a cognitive tool.

In any example herein, the server can be used to cause instructions to be sent to the second user device to display the second plurality of measurement fields.

In any example herein, the first access means and/or the second access means can be a based on a secure link or a secure push notification.

In any example herein, the individual can be a child (including a minor child).

In any example herein, the collecting first data from the first user comprises causing the first user device to render a first graphical user interface, the first graphical user interface displaying a first plurality of fields, each field of the first plurality of fields being associated with a first set of behaviors associated with at least one symptom of a cognitive condition.

In any example herein, the generating of a reimbursement report and/or a billing report can be based on the data received from the first user and/or the third user.

In any example herein, the adjustments to the type of tasks and/or CSIs can be made in real-time.

In any example herein, the cognitive platform and systems including the cognitive platform can be configured to present computerized tasks and platform interactions that inform cognitive assessment (including screening and/or monitoring) or to deliver cognitive treatment.

The exemplary cognitive platforms according to the principles described herein can be applicable to many different types of neuropsychological conditions, such as but not limited to dementia, Parkinson's disease, cerebral amyloid angiopathy, familial amyloid neuropathy, Huntington's disease, or other neurodegenerative condition, autism spectrum disorder (ASD), presence of the 16 pl 1.2 duplication, and/or an executive function disorder (such as but not limited to attention deficit hyperactivity disorder (ADHD), sensory-processing disorder (SPD), mild cognitive impairment (MCI), Alzheimer's disease, multiple-sclerosis, schizophrenia, depression, or anxiety).

The exemplary cognitive platforms according to the principles described herein can be applicable to many different types of neuropsychological conditions, such as but not limited to, Alzheimer's disease, dementia, Parkinson's disease, cerebral amyloid angiopathy, familial amyloid neuropathy, or Huntington's disease.

Any classification of an individual as to likelihood of onset and/or stage of progression of a condition (including a neurodegenerative condition) according to the principles herein can be transmitted as part of an enhanced analysis report as a signal to a medical device, healthcare computing system, or other device, and/or to a medical practitioner, a health practitioner, a physical therapist, a behavioral therapist, a sports medicine practitioner, a pharmacist, or other practitioner, to allow formulation of a course of treatment for the individual or to modify an existing course of treatment, including to determine a change in dosage of a drug, biologic or other pharmaceutical agent to the individual or to determine an optimal type or combination of drug, biologic or other pharmaceutical agent to the individual.

In any example herein, the cognitive platform can be configured as any combination of a medical device platform, a monitoring device platform, a screening device platform, or other device platform.

In non-limiting examples, the measurement tool data can be collected from measurements using one or more physiological or monitoring components and/or cognitive testing components. In any example herein, the one or more physiological components are configured for performing physiological measurements. The physiological measurements provide quantitative measurement data of physiological parameters and/or data that can be used for visualization of physiological structure and/or functions.

It is understood that reference to "drug" herein encompasses a drug, a biologic and/or other pharmaceutical agent.

In a non-limiting example, the physiological instrument can be a ±MRI, and the data can be measurement data indicative of the cortical thickness, brain functional activity changes, or other measure.

In other non-limiting examples, measurement tool data can include any data that can be used to characterize an individual's status, such as but not limited to age, gender or other similar data.

In any example herein, the data (including the data from the measurement fields, identifying data, and/or data from the measurement tool(s)) is collected with the individual's consent.

In any example herein, an individual consults with a healthcare practitioner prior to making any changes to a drug or other medication being taken, or to a regimen set for taking the drug or other medication.

In any example herein, the one or more physiological components can include any means of measuring physical characteristics of the body and nervous system, including electrical activity, heart rate, blood flow, and oxygenation levels, to provide the measurement tool data. This can include camera-based heart rate detection, measurement of galvanic skin response, blood pressure measurement, electroencephalogram, electrocardiogram, magnetic resonance imaging, near-infrared spectroscopy, and/or pupil dilation measures, to provide the measurement tool data.

Other examples of physiological measurements to provide measurement tool data include, but are not limited to, the measurement of body temperature, heart or other cardiac-related functioning using an electrocardiogramalectrical activity using an electroencephalogram (EEG), event-related potentials (ERPs), functional magnetic resonance imaging (FMRI), blood pressure, electrical potential at a portion of the skin, galvanic skin response (GSR), magnetoencephalogram (MEG), eye-tracking device or other optical detection device including processing units programmed to determine degree of pupillary dilation, functional near-infrared spectroscopy (fNIRS), and/or a positron emission tomography (PET) scanner. An EEG-fMRI or MEG-fMRI measurement allows for simultaneous acquisition of electrophysiology (EEG/MEG) data and hemodynamic (FMRI) data.

Non-Limiting Exemplary Cognitive Platforms And Platform Products

In any example herein, the cognitive platform can be configured for cognitive monitoring, cognitive assessment, cognitive screening, and/or cognitive treatment. Data derived from the cognitive platform can include one or more performance metrics and/or data indicative of cognitive abilities of the individual, generated based on the individual's interactions with the cognitive platform.

The exemplary cognitive platform can be configured for measuring data indicative of a user's performance at one or more tasks, to provide a user performance metric. The exemplary tasks may include an interference processing task, and/or a spatial navigation task, and/or an emotional/affective task. The exemplary performance metric can be used to derive an assessment of a user's cognitive abilities and/or to measure a user's response to a cognitive treatment, and/or to provide data or other quantitative indicia of a user's condition (including physiological condition and/or cognitive condition). Non-limiting exemplary cognitive platforms or platform products according to the principles herein can be configured to classify an individual as to an condition, the expression level of protein(s) that can be of clinical interest in the condition, and/or potential efficacy of use of the cognitive platform and/or platform product when the individual is administered a drug, biologic or other pharmaceutical agent, based on the data collected from the individual's interaction with the cognitive platform and/or platform product and/or metrics computed based on the analysis (and associated computations) of that data. Yet other non-limiting exemplary cognitive platforms or platform products according to the principles herein can be configured to classify an individual as to likelihood of onset and/or stage of progression of the condition, based on the data collected from the individual's interaction with the cognitive platform and/or platform product and/or metrics computed based on the analysis (and associated computations) of that data.

Any classification of an individual as to likelihood of onset and/or stage of progression of the condition according to the principles herein can be transmitted as a signal to a medical device, healthcare computing system, or other device, and/or to a medical practitioner, a health practitioner, a physical therapist, a behavioral therapist, a sports medicine practitioner, a pharmacist, or other practitioner, to allow formulation of a course of treatment for the individual or to modify an existing course of treatment, including to determine a change in dosage of a drug, biologic or other pharmaceutical agent to the individual or to determine an optimal type or combination of drug, biologic or other pharmaceutical agent to the individual.

In any example herein, the platform product or cognitive platform can be configured as any combination of a medical device platform, a monitoring device platform, a screening device platform, or other device platform.

The instant disclosure is also directed to exemplary systems that include platform products and cognitive platforms that are configured for coupling with one or more physiological or monitoring component and/or cognitive testing component. In some examples, the systems include platform products and cognitive platforms that are integrated with the one or more other physiological or monitoring component and/or cognitive testing component. In other examples, the systems include platform products and cognitive platforms that are separately housed from and configured for communicating with the one or more physiological or monitoring component and/or cognitive testing component, to receive data indicative of measurements made using such one or more components.

As used herein, the term "cData" refers to data collected from measures of an interaction of a user with a computer-implemented device formed as a platform product or a cognitive platform.

As used herein, the term "nData" refers to other types of data that can be collected according to the principles herein. Any component used to provide nData is referred to herein as a nData component.

In any example herein, the cData and/or nData can be collected in real-time.

In non-limiting examples, the nData can be collected from measurements using one or more physiological or monitoring components and/or cognitive testing components. In any example herein, the one or more physiological components are configured for performing physiological measurements. The physiological measurements provide quantitative measurement data of physiological parameters and/or data that can be used for visualization of physiological structure and/or functions.

As a non-limiting example, nData can be collected from measurements of types of protein and/or conformation of proteins in the tissue or fluid (including blood) of an individual and/or in tissue or fluid (including blood) collected from the individual. In some examples, the tissue and or fluid can be in or taken from the individual's brain. In other examples, the measurement of the conformation of the proteins can provide an indication of protein formation (e.g., whether the proteins are forming aggregates). The expression group can be defined based on a threshold expression level of the protein of clinical interest in the neurodegenerative condition, where a measured value of expression level above a pre-specified threshold defines a first expression group and a measured value of expression level below the pre-specified threshold defines a second expression group and/or other pharmaceutical agent.

In a non-limiting example, the physiological instrument can be a fMRI, and the nData can be measurement data indicative of the cortical thickness, brain functional activity changes, or other measure.

In other non-limiting examples, nData can include any data that can be used to characterize an individual's status, such as but not limited to age, gender or other similar data.

In any example herein, the data (including cData and nData) is collected with the individual's consent.

In any example herein, the one or more physiological components can include any means of measuring physical characteristics of the body and nervous system, including electrical activity, heart rate, blood flow, and oxygenation levels, to provide the nData. This can include camera-based heart rate detection, measurement of galvanic skin response, blood pressure measurement, electroencephalogram, electrocardiogram, magnetic resonance imaging, near-infrared spectroscopy, and/or pupil dilation measures, to provide the nData.

Other examples of physiological measurements to provide nData include, but are not limited to, the measurement of body temperature, heart or other cardiac-related functioning using an electrocardiogramalectrical activity using an electroencephalogram (EEG), event-related potentials (ERPs), functional magnetic resonance imaging (FMRI), blood pressure, electrical potential at a portion of the skin, galvanic skin response (GSR), magneto-encephalogram (MEG), eye-tracking device or other optical detection device including processing units programmed to determine degree of pupillary dilation, functional near-infrared spectroscopy (fNIRS), and/or a positron emission tomography (PET) scanner. An EEG-fMRI or MEG-fMRI measurement allows for simultaneous acquisition of electrophysiology (EEG/MEG) nData and hemodynamic (FMRI) nData.

The FMRI also can be used to provide provides measurement data (nData) indicative of neuronal activation, based on the difference in magnetic properties of oxygenated versus de-oxygenated blood supply to the brain. The FMRI can provide an indirect measure of neuronal activity by measuring regional changes in blood supply, based on a positive correlation between neuronal activity and brain metabolism.

A PET scanner can be used to perform functional imaging to observe metabolic processes and other physiological measures of the body through detection of gamma rays emitted indirectly by a positron-emitting radionuclide (a tracer). The tracer can be introduced into the user's body using a biologically-active molecule. Indicators of the metabolic processes and other physiological measures of the body can be derived from the scans, including from computer reconstruction of two- and three-dimensional images of from nData of tracer concentration from the scans. The nData can include measures of the tracer concentration and/or the PET images (such as two- or three-dimensional images).

In any example herein, the task can be a spatial navigation task according to the principles herein. In this example, a computing device is configured to render a view of a landscape, such as but not limited to the example of FIG. 13.

Figure 13:
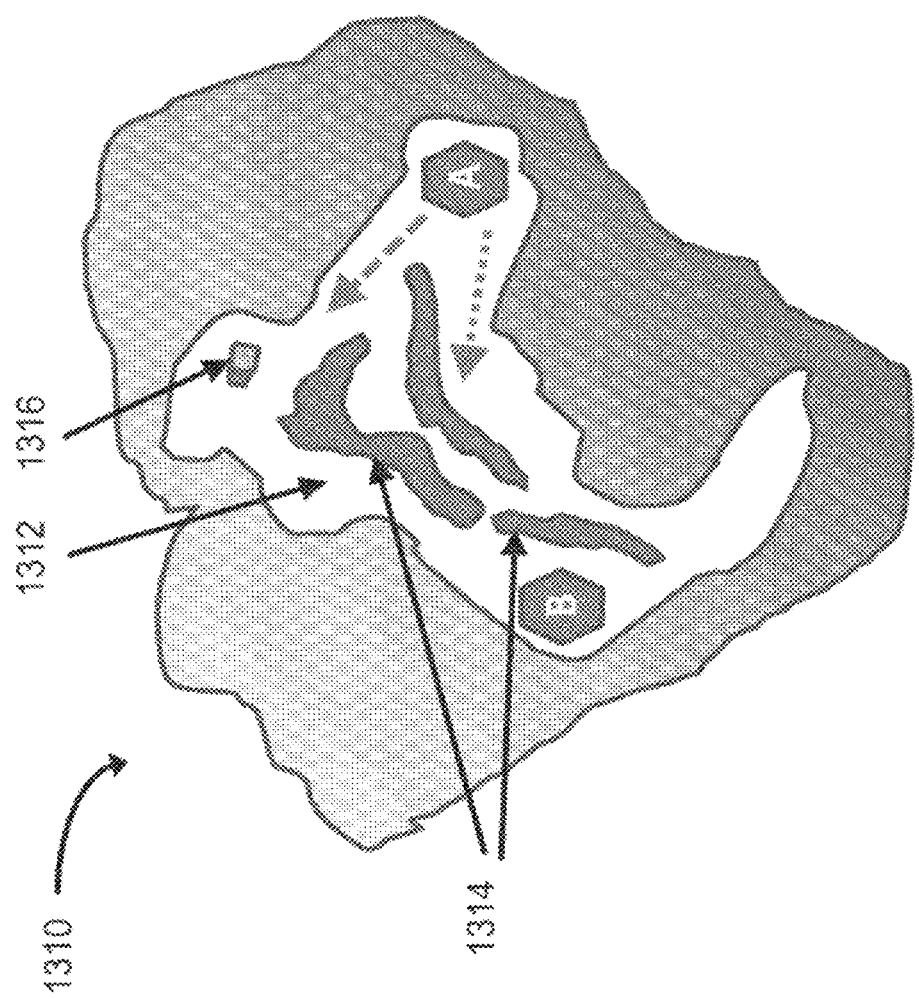
FIG. 13 is a rendered view of a landscape that may be used in a spatial navigation task, in accordance with an embodiment of the disclosure.

FIG. 13 shows an elevated, overhead view of a landscape 1310 that includes one or more internal course 1312 and obstacles 1314. In this example, portions of the course 1312 are configured to include pathways and passageways that allow traversal of an avatar or other guidable element 1316. The navigation task requires an individual to formulate a pathway about the strategically positioned obstacles 1314 from an initial point ("A") to at least one target location ("B"). The computing device can be configured to present instructions to the individual to navigate the course 1312. The computing device also can be configured to provide an individual with an input device or other type of control element that allows the individual to traverse the course 1312, including specifying and/or controlling one or more of the speed of movement, orientation, velocity, choice of navigation strategy, the wait or delay period, or other period of inaction, prior to continuing in a given direction of a course or changing direction, time interval to complete a course, and/or frequency or number of times of referral to an aerial or elevated view of a landscape (including as a map), including values of any of these parameters as a function of time. As another non-limiting example, the performance metrics can include a measure of the degree of optimization of the path navigated by the individual through the course, such as though determining the shortest path or near-shortest path through the course.

The computing device can be configured to collect data indicative of the performance metric that quantifies the navigation strategy employed by the individual from the initial point ("A") to reach one or more target points ("B"). For example, the computing device initial point ("A") along the dashed line or the dotted line, the speed of movement, the orientation of the avatar or other guidable element, among other measures. In the various examples, performance metrics that can be measured using the computing device can include data indicative of the speed of movement, orientation, velocity, choice of navigation strategy, wait or delay period, or other period of inaction, prior to continuing in a given direction of a course or changing direction, time interval to complete a course, and/or frequency or number of times of referral to an aerial or elevated view of a landscape (including as a map), including values of any of these parameters as a function of time. As another non-limiting example, the performance metrics can include a measure of the degree of optimization of the path navigated by the individual through the course, such as though determining the shortest path or near-shortest path through the course.

In another example herein, a task can involve one or more activities that a user is required to engage in. Any one or more of the tasks can be computer-implemented as computerized stimuli or interaction (described in greater detail below).

For a targeting task, the cognitive platform may require temporally-specific and/or position-specific responses from a user. For a navigation task, the cognitive platform may require position-specific and/or motion-specific responses from the user. For a facial expression recognition or object recognition task, the cognitive platform may require temporally-specific and/or position-specific responses from the user. The multi-tasking tasks can include any combination of two or more tasks. In non-limiting examples, the user response to tasks, such as but not limited to targeting and/or navigation and/or facial expression recognition or object recognition task(s), can be recorded using an input device of the cognitive platform. Non-limiting examples of such input devices can include a touch, swipe or other gesture relative to a user interface or image capture device (such as but not limited to a touch-screen or other pressure sensitive screen, or a camera), including any form of graphical user interface configured for recording a user interaction. In other non-limiting examples, the user response recorded using the cognitive platform for tasks, such as but not limited to targeting and/or navigation and/or facial expression recognition or object recognition task(s), can include user actions that cause changes in a position, orientation, or movement of a computing device including the cognitive platform. Such changes in a position, orientation, or movement of the computing device, such as but not limited to a sensor. Non-limiting examples of sensors include a motion sensor, position sensor, and/or an image capture device (such as but not limited to a camera).

FIGS. 14A-15H show non-limiting exemplary user interfaces that can be rendered using exemplary systems, methods, and apparatus herein to render the tasks and/or interferences (either or both with computerized element) for user interactions. The non-limiting exemplary user interfaces of FIGS. 14A-15H also can be used for one or more of: to collect the data indicative of the individual's responses to the tasks and/or the interferences and the computerized element, to show progress metrics, or to provide the analysis metrics.

Figure 14A:
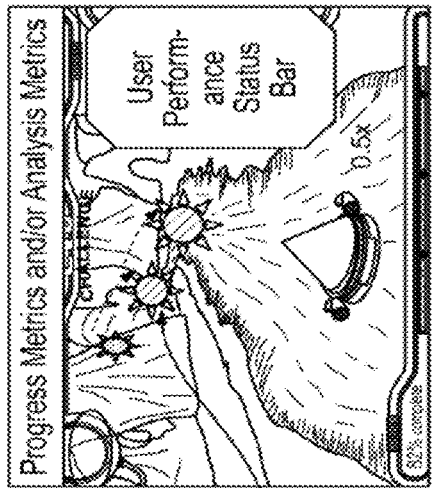
FIGS. 14A-14D and 15A-15H are graphical representations of exemplary user interfaces that can be rendered using exemplary systems, methods, and apparatus to render the tasks and/or interferences (either or both with computerized element) for user interactions, and which may also be used for one or more of: to collect data indicative of the individual's responses to the tasks and/or the interferences and the computerized element, to show progress metrics, or to provide the analysis metrics.
Figure 14B:
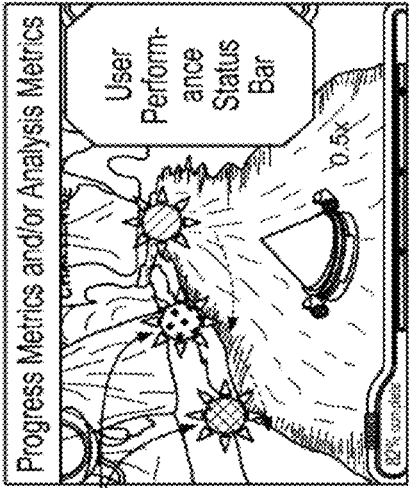
Figure 14C:
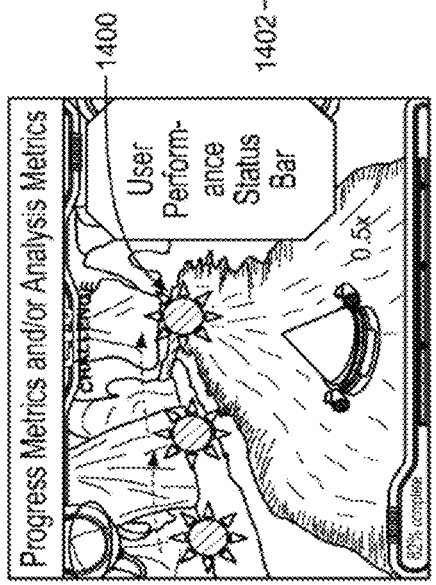
Figure 14D:
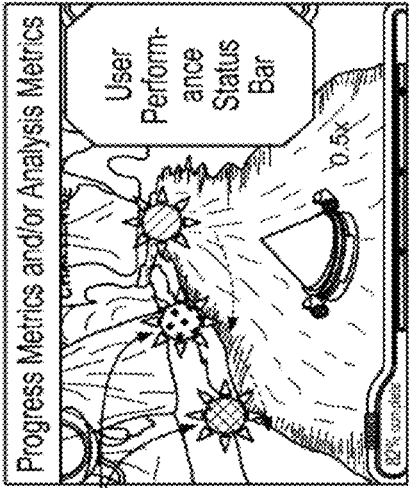

FIGS. 14A-14D show exemplary of the features of object (s) (targets or non-targets) that can be rendered as time-varying characteristics to an exemplary user interface, according to the principles herein. FIG. 14A shows an example where the modification to the time-varying characteristics of an aspect of the object 1400 rendered to the user interface is a dynamic change in position and/or speed of the object 1400 relative to environment rendered in the graphical user interface. FIG. 14B shows an example where the modification to the time-varying characteristics of an aspect of the object 1402 rendered to the user interface is a dynamic change in size and/or direction of trajectory/motion, and/or orientation of the object 1402 relative to the environment rendered in the graphical user interface. FIG. 14C shows an example where the modification to the time-varying characteristics of an aspect of the object 1404 rendered to the user interface is a dynamic change in shape or other type of the object 1404 relative to the environment rendered in the graphical user interface. In this non-limiting example, the time-varying characteristic of object 1404 is effected using morphing from a first type of object (a star object) to a second type of object (a round object). In another non-limiting example, the time-varying characteristic of object 1404 is effected by rendering a blendshape as a proportionate combination of a first type of object and a second type of object. FIG. 14C shows an example in which the modification to the time-varying characteristics of an aspect of the object 1404 rendered to the user interface is a dynamic change in shape or other type of the object 1404 rendered in the graphical user interface (in this non-limiting example, from a star object to a round object). FIG. 14D shows an example where the modification to the time-varying characteristics of an aspect of the object 1406 rendered to the user interface is environment rendered in the graphical user interface (in this non-limiting example, from a star object having a first pattern to a round object having a second pattern). In another non-limiting example, the time-varying characteristic of object can be a rate of change of a facial expression depicted on or relative to the object. In any example herein, the foregoing time-varying characteristic can be applied to an object including the computerized element to modify a cognitive or emotional load of the individual's interaction with the apparatus (e.g., computing device or cognitive platform).

Figure 15A:
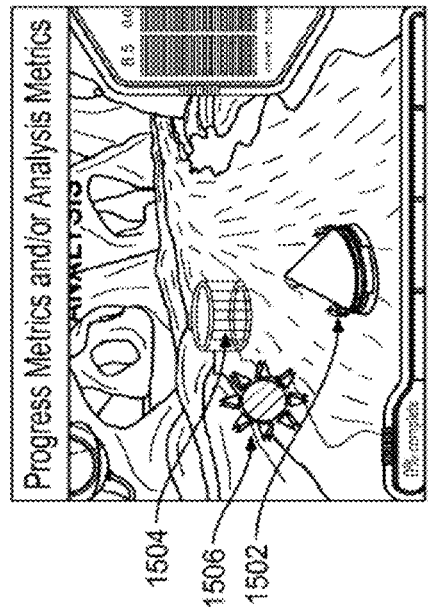
Figure 15B:
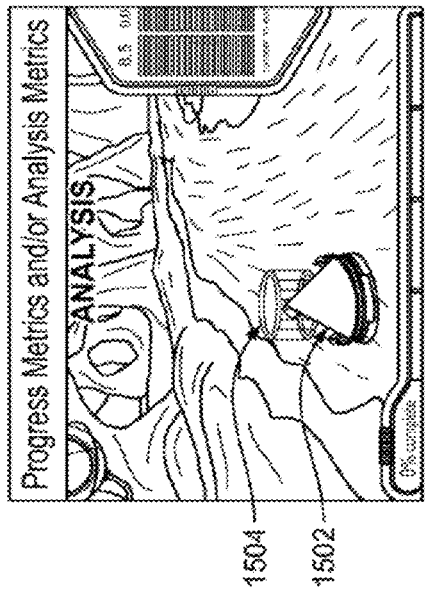
Figure 15C:
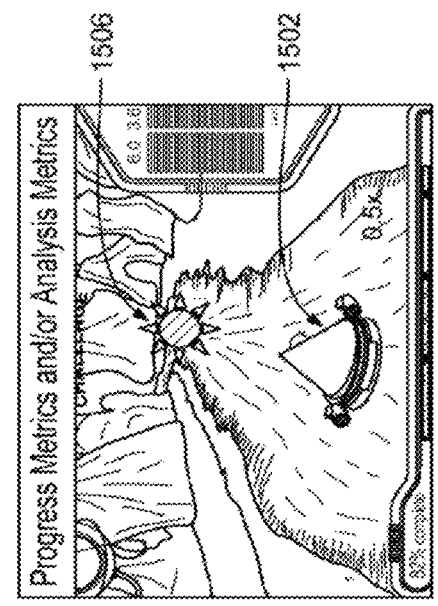
Figure 15D:
Figure 15E:
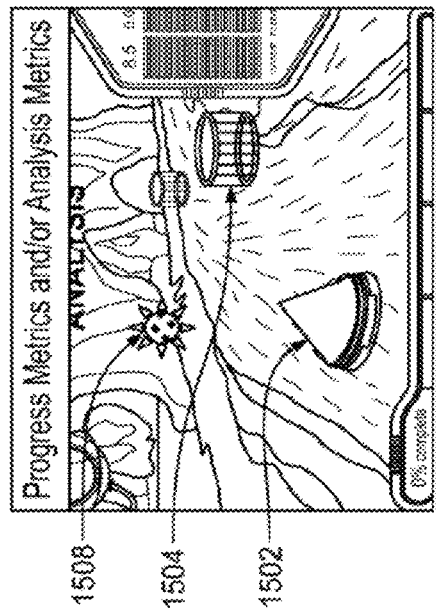
Figure 15F:
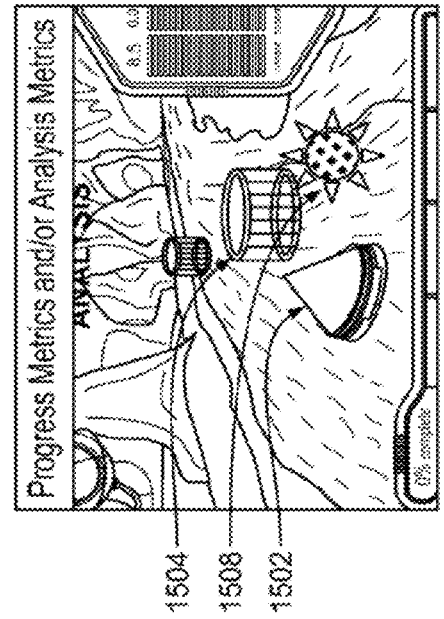
Figure 15G:
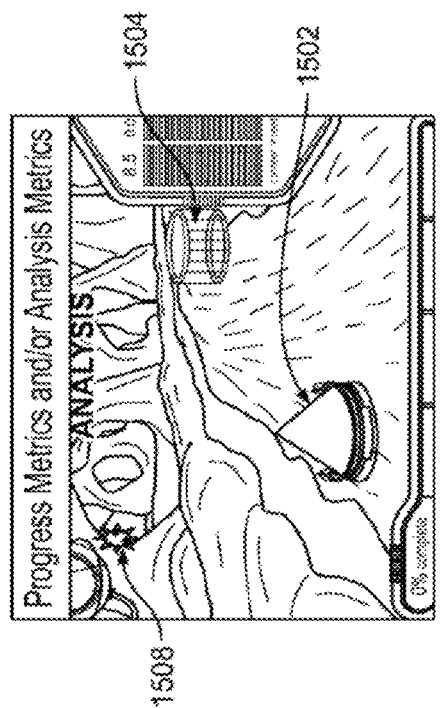
Figure 15H:
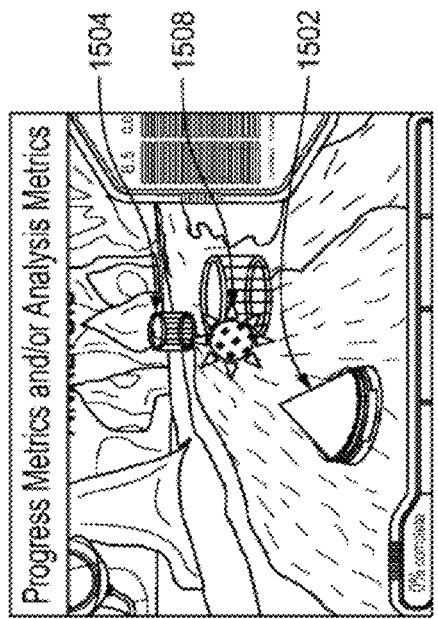

FIGS. 15A-15H show a non-limiting example of the dynamics of tasks and interferences that can be rendered at user interfaces, according to the principles herein. In this example, the primary task is a visuo-motor navigation task, and the interference is target discrimination (as a secondary task). As shown in FIGS. 15D, the individual is required to perform the navigation task by controlling the motion of the avatar 1502 along a path that coincides with the milestone objects 1504. FIGS. 15A-15H show a non-limiting exemplary implementation where the individual is expected to actuate an apparatus or computing device (or other sensing device) to cause the avatar 1502 to coincide with the milestone object 1504 as the response in the navigation task, with scoring based on the success of the individual at crossing paths with (e.g., hitting) the milestone objects 1504. In another example, the individual is expected to actuate an apparatus or computing device (or other sensing device) to cause the avatar 1502 to miss the milestone object 1504, with scoring based on the success of the individual at avoiding the milestone objects 1504. FIGS. 15A-15C show the dynamics of a target object 1506 (a star having a first type of pattern). FIGS. 15E-15H show the dynamics of a non-target object 1508 (a star having a second type of pattern).

In the example of FIGS. 15A-15H, the processing unit of the exemplary system, method, and apparatus is configured to receive data indicative of the individual's physical actions to cause the avatar 1502 to navigate the path. For example, the individual may be required to perform physical actions to "steer" the avatar, e.g., by changing the rotational orientation or otherwise moving a computing device. Such action can cause a gyroscope or accelerometer or other motion or position sensor device to detect the movement, thereby providing measurement data indicative of the individual's degree of success in performing the navigation task.

In the example of FIGS. ISA-15C and 15E-15H, the processing unit of the exemplary system, method, and apparatus is configured to receive data indicative of the individual's physical actions to perform the target discrimination task. For example, the individual may be instructed prior to a trial or other session to tap, or make other physical indication, in response to display of a target object 1506, and not to tap to make the physical indication in response to display of a non-target object 1508. In FIGS. ISA-15C and 15E-15H, the target discrimination task acts as an interference (i.e., an instance of a secondary task) to the primary navigation task, in an interference processing multi-tasking implementation. As described hereinabove, the exemplary systems, methods, and apparatus can cause the processing unit to render a display feature to display the instructions to the individual as to the expected performance. As also described hereinabove, the processing unit of the exemplary system, method, and apparatus can be configured to (i) receive the data indicative of the measure of the degree and type of the individual's response to the primary task substantially simultaneously as the data indicative of the measure of the degree and type of the individual's response to the interference is collected (whether the interference includes a target or a non-target), or (ii) to selectively receive data indicative of the measure of the degree and type of the individual's response to an interference that includes a target stimulus (i.e., an interruptor) substantially simultaneously (i.e., at substantially the same time) as the data indicative of the measure of the degree and type of the individual's response to the task is collected and to selectively not collect the measure of the degree and type of the individual's response to an interference that includes a non-target stimulus (i.e., a distraction) substantially simultaneously (i.e., at substantially the same time) as the data indicative of the measure of the degree and type of the individual's response to the task is collected.

In an exemplary implementation involving multi-tasking tasks, the computer device is configured (such as using at least one specially-programmed processing unit) to cause the cognitive platform to present to a user two or more different type of tasks, such as but not limited to, targeting and/or navigation and/or facial expression recognition or object recognition tasks, during a short time frame (including in real-time and/or substantially simultaneously). The computer device is also configured (such as using at least one specially-programmed processing unit) to collect data indicative of the type of user response received to the multi-tasking tasks, within the short time frame (including in real-time and/or substantially to the individual within the short time frame (including in real-time and/or substantially simultaneously), and the computing device can be configured to receive data indicative of the user response(s) relative to the two or more different types of tasks within the short time frame (including in real-time and/or substantially simultaneously).

In some examples, the short time frame can be of any time interval at a resolution of up to about 1.0 millisecond or greater. The time intervals can be, but are not limited to, durations of time of any division of a periodicity of about 2.0 milliseconds or greater, up to any reasonable end time. The time intervals can be, but are not limited to, about 3.0 millisecond, about 5.0 millisecond, about 10 milliseconds, about 25 milliseconds, about 40 milliseconds, 10 about 50 milliseconds, about 60 milliseconds, about 70 milliseconds, about 100 milliseconds, or greater. In other examples, the short time frame can be, but is not limited to, fractions of a second, about a second, between about 1.0 and about 2.0 seconds, or up to about 2.0 seconds, or more.

In some examples, the platform product or cognitive platform can be configured to collect data indicative of a reaction time of a user's response relative to the time of presentation of the tasks. For example, the computing device can be configured to cause the platform product or cognitive platform to provide smaller or larger reaction time window for a user to provide a response to the tasks as a way of adjusting the difficulty level.

As used herein, the term "computerized stimuli or interaction" or "CSI" refers to a computerized element that is presented to a user to facilitate the user's interaction with a stimulus or other interaction. As non-limiting examples, the computing device can be configured to present auditory stimulus or initiate other auditory-based interaction with the user, and/or to present vibrational stimuli or initiate other vibrational-based interaction with the user, and/or to present tactile stimuli or initiate other tactile-based interaction with the user, and/or to present visual stimuli or initiate other visual-based interaction with the user.

Any task according to the principles herein can be presented to a user via a computing device, actuating component, or other device that is used to implement one or more stimuli or other interactive element. For example, the task can be presented to a user by rendering a graphical user interface to present the computerized stimuli or interaction (CSI) or tactile, or vibrational computerized elements (including CSIs) using an actuating component. Description of use of (and analysis of data from) one or more CSIs in the various examples herein also encompasses use of (and analysis of data from) tasks comprising the one or more CSIs in those examples.

In an example where the computing device is configured to present visual CSI, the CSI can be rendered using at least one graphical user interface to be presented to a user. In some examples, at least one graphical user interface is configured for measuring responses as the user interacts with CSI computerized element rendered using the at least one graphical user interface. In a non-limiting example, the graphical user interface can be configured such that the CSI computerized element(s) are active, and may require at least one response from a user, such that the graphical user interface is configured to measure data indicative of the type or degree of interaction of the user with the platform product. In another example, the graphical user interface can be configured such that the CSI computerized element(s) are a passive and are presented to the user using the at least one graphical user interface but may not require a response from the user. In this example, the at least one graphical user interface can be configured to exclude the recorded response of an interaction of the user, to apply a weighting factor to the data indicative of the response (e.g., to weight the response to lower or higher values), or to measure data indicative of the response of the user with the platform product as a measure of a misdirected response of the user (e.g., to issue a notification or other feedback to the user of the misdirected response).

In an example, the cognitive platform and/or platform product can be configured as a processor-implemented system, method or apparatus that includes and at least one processing unit. In an example, the at least one processing unit can be programmed to render at least one graphical user interface to present the computerized stimuli or interaction (CSI) or other interactive elements to the user for interaction. In other examples, the at least one processing unit can be programmed to cause an actuating component of the platform product to effect auditory, tactile, or vibrational computerized elements (including CSis) to effect the stimulus or other interaction with the user. The at least one processing unit can be programmed to cause a component of the program product to receive data indicative of at least one user response based on the user interaction with the CSI or other interactive element (such as but not limited to graphical user interface is rendered to present the computerized stimuli or interaction (CSI) or other interactive elements to the user, the at least one processing unit can be programmed to cause graphical user interface to receive the data indicative of at least one user response. The at least one processing unit also can be programmed to: analyze the cData to provide a measure of the individual's cognitive condition, and/or analyze the differences in the individual's performance based on determining the differences between the user's responses (including based on differences in the cData), and/or adjust the difficulty level of the auditory, tactile, or vibrational computerized elements (including CSis), the CSis or other interactive elements based on the analysis of the cData (including the measures of the individual's performance determined in the analysis), and/or provide an output or other feedback from the platform product that can be indicative of the individual's performance, and/or cognitive assessment, and/or response to cognitive treatment, and/or assessed measures of cognition. In non-limiting examples, the at least one processing unit also can be programmed to classify an individual as to an condition, the expression level of protein(s) that can be of clinical interest in the condition, and/or potential efficacy of use of the cognitive platform and/or platform product when the individual is administered a drug, biologic or other pharmaceutical agent, based on the cData collected from the individual's interaction with the cognitive platform and/or platform product and/or metrics computed based on the analysis (and associated computations) of that cData. In non-limiting examples, the at least one processing unit also can be programmed to classify an individual as to likelihood of onset and/or stage of progression of a condition, based on the cData collected from the individual's interaction with the cognitive platform and/or platform product and/or metrics computed based on the analysis (and associated computations) of that cData. The neurodegenerative condition can be, but is not limited to, lupus or multiple sclerosis.

An exemplary system, method, and apparatus according to the principles herein includes a platform product (including using an APP) that uses a cognitive platform configured to render at least one emotional/affective element (EAE), to add emotional processing as an overt component for tasks in MTG or STG. In one example, the EAE is used in the tasks configured to assess cognition or improve cognition related to emotions, and the data (including cData) collected as a measure of user interaction with the rendered EAE in the platform product is used to determine the measures of the assessment of cognition or the improvement to interface, or as auditory, tactile, or vibrational elements, of the platform product. The EAE can be configured to collect data to measure the impact of emotions on non-emotional cognition, such as by causing the graphical user interface to render spatial tasks for the user to perform under emotional load, and/or to collect data to measure the impact of non-emotional cognition on emotions, such as by causing the graphical user interface to render features that employ measures of executive function to regulate emotions. In one exemplary implementation, the graphical user interface can be configured to render tasks for identifying the emotion indicated by the CSI (based on measurement data), maintaining that identification in working memory, and comparing it with the measures of emotion indicated by subsequent CSI, while under cognitive load due to MTG.

In other examples, the platform product can be configured as a processor-implemented system, method or apparatus that includes a display component, an input device, and the at least one processing unit. The at least one processing unit can be programmed to render at least one graphical user interface, for display at the display component, to present the computerized stimuli or interaction (CSI) or other interactive elements to the user for interaction. In other examples, the at least one processing unit can be programmed to cause an actuating component of the platform product to effect auditory, tactile, or vibrational computerized elements (including CSIs) to effect the stimulus or other interaction with the user.

Non-limiting examples of an input device include a touch-screen, or other pressure-sensitive or touch-sensitive surface, a motion sensor, a position sensor, a pressure sensor, joystick, exercise equipment, and/or an image capture device (such as but not limited to a camera).

In any example, the input device is configured to include at least one component configured to receive input data indicative of a physical action of the individual(s), where the data provides a measure of the physical action of the individual(s) in interacting with the cognitive platform and/or platform product, e.g., to perform the one or more tasks and/or tasks with interference.

The analysis of the individual's performance may include using the computing device to compute percent accuracy, number of hits and/or misses during a session or from a measures is the amount time the individual takes to respond after the presentation of a task (e.g., as a targeting stimulus). Other indicia can include, but are not limited to, reaction time, response variance, number of correct hits, omission errors, false alarms, learning rate, spatial deviance, subjective ratings, and/or performance threshold, etc.

In a non-limiting example, the user's performance can be further analyzed to compare the effects of two different types of tasks on the user's performances, where these tasks present different types of interferences (e.g., a distraction or an interruptor). The computing device is configured to present the different types of interference as CSIs or other interactive elements that divert the user's attention from a primary task. For a distraction, the computing device is configured to instruct the individual to provide a primary response to the primary task and not to provide a response (i.e., to ignore the distraction). For an interruptor, the computing device is configured to instruct the individual to provide a response as a secondary task, and the computing device is configured to obtain data indicative of the user's secondary response to the interruptor within a short time frame (including at substantially the same time) as the user's response to the primary task (where the response is collected using at least one input device). The computing device is configured to compute measures of one or more of a user's performance at the primary task without an interference, performance with the interference being a distraction, and performance with the interference being an interruption. The user's performance metrics can be computed based on these measures. For example, the user's performance can be computed as a cost (performance change) for each type of interference (e.g., distraction cost and interruptor/multi-tasking cost). The user's performance level on the tasks can be analyzed and reported as feedback, including either as feedback to the cognitive platform for use to adjust the difficulty level of the tasks, and/or as feedback to the individual concerning the user's status or progression.

In a non-limiting example, the computing device can also be configured to analyze, store, and/or output the reaction time for the user's response and/or any statistical measures for the individual's performance (e.g., percentage of correct or incorrect response in the last number of sessions, over a specified duration of time, or specific for a type of tasks (including non-target and/or target stimuli, a specific type of task, etc.).

In a non-limiting example, the computerized element includes at least one task rendered at a graphical user interface as a visual task or presented as an auditory, tactile, or vibrational task. Each task can be rendered as interactive mechanics that are designed to elicit a response from a user after the user is exposed to stimuli for the purpose of cData and/or nData collection.

In a non-limiting example, the computerized element includes at least one platform interaction (gameplay) element of the platform rendered at a graphical user interface, or as auditory, tactile, or vibrational element of a program product. Each platform interaction (gameplay) element of the platform product can include interactive mechanics (including in the form of videogame-like mechanics) or visual (or cosmetic) features that may or may not be targets for cData and/or nData collection.

As used herein, the term "gameplay" encompasses a user interaction (including other user experience) with aspects of the platform product.

In a non-limiting example, the computerized element includes at least one element to indicate positive feedback to a user. Each element can include an auditory signal and/or a visual signal emitted to the user that indicates success at a task or other platform interaction element, i.e., that the user responses at the platform product has exceeded a threshold success measure on a task or platform interaction (gameplay) element.

In a non-limiting example, the computerized element includes at least one element to indicate negative feedback to a user. Each element can include an auditory signal and/or a visual signal emitted to the user that indicates failure at a task or platform interaction (gameplay) element, i.e., that the user responses at the platform product has not met a threshold success measure on a task or platform interaction element.

In a non-limiting example, the computerized element includes at least one element for messaging, i.e., a communication to the user that is different from positive feedback or negative feedback.

In a non-limiting example, the computerized element includes at least one element for indicating a reward. A reward computer element can be a computer-generated feature that is delivered to a user to promote user satisfaction with the CSIs and as a result, increase In a non-limiting example, the cognitive platform can be configured to render multi-task interactive elements. In some examples, the multi-task interactive elements are referred to as multi-task gameplay (MTG). The multi-task interactive elements include interactive mechanics configured to engage the user in multiple temporally-overlapping tasks, i.e., tasks that may require multiple, substantially simultaneous responses from a user.

In a non-limiting example, the cognitive platform can be configured to render single-task interactive elements. In some examples, the single-task interactive elements are referred to as single-task gameplay (STG). The single-task interactive elements include interactive mechanics configured to engage the user in a single task in a given time interval.

According to the principles herein, the term "cognition" or "cognitive" refers to the mental action or process of acquiring knowledge and understanding through thought, experience, and the senses. This includes, but is not limited to, psychological concepts/domains such as, executive function, memory, perception, attention, emotion, motor control, and interference processing. An exemplary computer-implemented device according to the principles herein can be configured to collect data indicative of user interaction with a platform product, and to compute metrics that quantify user performance. The quantifiers of user performance can be used to provide measures of cognition (for cognitive assessment) or to provide measures of status or progress of a cognitive treatment.

According to the principles herein, the term "treatment" or "treat" refers to any manipulation of CSI in a platform product (including in the form of an APP) that results in a measurable improvement of the abilities of a user, such as but not limited to improvements related to cognition, a user's mood, emotional state, and/or level of engagement or attention to the cognitive platform. The degree or level of improvement can be quantified based on user performance measures as describe herein. In an example, the term "treatment" may also refer to a therapy.

According to the principles herein, the term "session" refers to a discrete time period, with a clear start and finish, during which a user interacts with a platform product to receive assessment or treatment from the platform product (including in the form of an APP).

According to the principles herein, the term "assessment" refers to at least one session of user interaction with CSIs or other feature or element of a platform product. The data collected from one or more assessments performed by a user using a platform product (including in the form of an APP) can be used as to derive measures or other quantifiers of cognition, or other aspects of a user's abilities.

According to the principles herein, the term "emotional load" refers to cognitive load that is specifically associated with processing emotional information or regulating emotions.

According to the principles herein, the term "cognitive load" refers to the amount of mental resources that a user may need to expend to complete a task. This term also can be used to refer to the challenge or difficulty level of a task or gameplay.

In an example, the platform product comprises a computing device that is configured to present to a user a cognitive platform based on interference processing. In an exemplary system, method and apparatus that implements interference processing, at least one processing unit is programmed to render at least one first graphical user interface or cause an actuating component to generate an auditory, tactile, or vibrational signal, to present first CSIs as a first task that requires a first type of response from a user. The exemplary system, method and apparatus is also configured to cause the at least one processing unit to render at least one second graphical user interface or cause the actuating component to generate an auditory, tactile, or vibrational signal, to present second CSIs as a first interference with the first task, requiring a second type of response from the user to the first task in the presence of the first interference. In a non-limiting example, the second type of response can include the first type of response to the first task and a secondary response to the first interference. In another non-limiting example, the second type of response may not include, and be quite different from, the first type of response. The at least one processing unit is also programmed to receive data indicative of the first type of response and the second type of response based on the user interaction with the platform product (such as but not limited to cData), such as but not limited to by rendering the at least one graphical user interface to receive the data. The platform product also can be configured to receive nData indicative of measurements made before, during, and/or after the user interacts with the cognitive platform (including nData from measurements of physiological or monitoring components and/or cognitive testing components). The at least one processing unit also can be programmed to: analyze the cData and/or nData to provide a measure of the individual's condition (including physiological and/or cognitive condition), and/or analyze the differences in the individual's performance based on determining the differences between the measures of the user's first type and second type of responses (including based on differences in the cData) and differences in the associated nData. The at least one processing unit also can be programmed to: adjust the difficulty level of the first task and/or the first interference based on the analysis of the cData and/or nData (including the measures of the individual's performance and/or condition (including physiological and/or cognitive condition) determined in the analysis), and/or provide an output or other feedback from the platform product that can be indicative of the individual's performance, and/or cognitive assessment, and/or response to cognitive treatment, and/or assessed measures of cognition. In non-limiting examples, the at least one processing unit also can be programmed to classify an individual as to an condition, the expression level of protein(s) that can be of clinical interest in the condition, and/or potential efficacy of use of the cognitive platform and/or platform product when the individual is administered a drug, biologic or other pharmaceutical agent, based on nData and the cData collected from the individual's interaction with the cognitive platform and/or platform product and/or metrics computed based on the analysis (and associated computations) of that cData and the nData. In non-limiting examples, the at least one processing unit also can be programmed to classify an individual as to likelihood of onset and/or stage of progression of an condition, based on nData and the cData collected from the individual's interaction with the cognitive platform and/or platform product and/or metrics computed based on the analysis (and associated computations) of that cData and the nData. The condition can be, but is not limited to, lupus and multiple sclerosis.

In an example, the feedback from the differences in the individual's performance based on determining the differences between the measures of the user's first type and second type of responses and the nData can be used as an input in the cognitive platform that indicates real-time performance of the individual during one or more session(s). The data of the feedback can be used to as an input to a computation component of the computing device to determine a degree of adjustment that the cognitive platform makes to a difficulty level of the first task and/or the first interference that the user interacts within the same ongoing session and/or within a subsequently-performed session.

As a non-limiting example, the cognitive platform based on interference processing can be a cognitive platform based on the Project: EVO™ platform by Akili Interactive Labs, Inc. (Boston, MA).

In an exemplary system, method and apparatus according to the principles herein that is based on interference processing, the graphical user interface is configured such that, as a component of the interference processing, one of the discriminating features of the targeting task that the user responds to is a feature in the platform that displays an emotion, a shape, a color, and/or a position that serves as an interference element in interference processing.

Examples

A health screen with health tips may include the following features:

| Page Element | Functional Requirement |
| --- | --- |
| Health Tips sub tab and list of health tips | When a user tabs on this subtab, he or she is shown a list of cards - one for each relevant external resource article that meets the queries. The cards are refreshed every 7 days. There is infinite scroll pagination |
| Health tip card - photo | A photo is provided via the API The article's headline is shown as a link When a user touches the card, he or she is taken to the relevant article page |

| Page Element | Functional Requirement |
| --- | --- |
| Health tip card - no photo | The article headline is shown as a link. When a user touches the card, he or she is taken to the relevant article page |
| Like button (heart) | When a user touches the heart, it fills in to give feedback that it has been pressed and the overall number increases by 1. When the user touches a filled heart, the heart unfills and the overall number decreases by 1 |

An article page may include the following features:

| Page Element | Functional Requirement |
| --- | --- |
| Navigation | When a user touches the <- arrow, he or she is taken to a reference screen. |
| Section title | Health Tips |
| Article Title | Shows the title of the article |
| Like button (heart) | When a user touches the heart, it fills in to give feedback that it has been pressed and the overall number increases by 1. When the user touches a filled heart, the heart unfills and the overall number decreases by 1 |
| Image/photo | If a photo/image is available, show it on the article page. If not, do not show it on the article page. |
| Article copy | Show the article copy on the page |
| Related health tips | Show 1-3 health tips that match the behavior variable of the current article If no related health tips, do not show the subheading |

CONCLUSION

The above-described embodiments can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single computer or distributed among multiple computers.

In this respect, various aspects of the disclosure may be embodied at least in part as a computer readable storage medium (or multiple computer readable storage media) (e.g., a computer memory, compact disks, optical disks, magnetic tapes, flash memories, circuit configurations in Field Programmable Gate Arrays or other semiconductor devices, or other tangible computer storage medium or non-transitory medium) encoded with one or more programs that, when executed on one or more computers or other processors, perform methods that implement the various embodiments of the technology discussed above. The computer readable medium or media can be transportable, such that the program or programs stored thereon can be loaded onto one or more different computers or other processors to implement various aspects of the present technology as discussed above.

The terms "program" or "software" are used herein in a generic sense to refer to any type of computer code or set of computer-executable instructions that can be employed to program a computer or other processor to implement various aspects of the present technology as discussed above. Additionally, it should be appreciated that according to one aspect of this embodiment, one or more computer programs that when executed perform methods of the present technology need not reside on a single computer or processor, but may be distributed in a modular fashion amongst a number of different computers or processors to implement various aspects of the present technology.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The described embodiments of the disclosure are intended to be merely exemplary and numerous variations and modifications will be apparent to those skilled in the art. All such variations and modifications are intended to be within the scope of the present invention as defined in the appended claims.

What is claimed is:

1. A system comprising:
   one or more processors; and
   a non-transitory computer-readable memory device communicably coupled with the one or more processors;
   wherein the one or more processors are configured to execute a plurality of modules stored in the non-transitory computer-readable memory device, and wherein the plurality of modules comprises:
      a cognitive training application comprising a plurality of computerized stimuli or interactions configured to be presented to an individual under study at a display of a computing device,
      wherein the computing device comprises a motion sensor and/or a position sensor,
      wherein the plurality of computerized stimuli or interactions comprise a primary task configured to elicit a physical action from the individual under study at an input device of the computing device, and a secondary task configured to distract the individual under study from performing the primary task,
      wherein the cognitive training application is configured to simultaneously measure data indicative of a first response from the individual under study to the primary task and a second response from the individual under study to the secondary task;
      an end user application configured to render a graphical user interface to a first user at a first user device, wherein the end user application is configured to enable the first user to:
         configure one or more user roles for one or more other users of the end user application, wherein the one or more other users comprise a healthcare practitioner user;
         provide one or more user-generated inputs associated with one or more of behavior data and symptom measurement data associated with a condition of the individual under study, and define access permissions for the one or more user roles;
      an authentication module configured to execute one or more operations for enforcing the access permissions such that the one or more user roles are selectively limited to providing and accessing a first subset of the behavior data and symptom measurement data within the end user application;
      an analytics module configured to execute one or more operations for:
         receiving a plurality of user activity data from an instance of the cognitive training application,
         wherein the plurality of user activity data comprises motion sensor data and/or position sensor data received via the computing device in response to one or more motion-specific responses and/or position-specific responses from the individual under study; and
         analyzing the plurality of user activity data, the behavior data and the symptom measurement data according to a machine learning framework comprising a classifier model configured to classify the plurality of user activity data, the behavior data and the symptom measurement data to generate a composite profile comprising one or more composite variables,
         wherein the one or more composite variables comprise a measure of correlation with therapy compliance or treatment response based on a training dataset comprising training measurement data from subjects that are classified as to a known measure of therapy compliance or treatment response; and
      a reporting module configured to execute one or more operations for:
         processing the classified plurality of user activity data, the behavior data and the symptom measurement data to generate an analysis report for the individual under study,
         wherein the symptom measurement data comprises physiological signals selected from electrical activity, heart rate, blood flow, and oxygenation levels, received from a physiological measurement component,
         wherein the analysis report comprises an indication of a cognitive measure of the individual under study based on the composite profile, and
         presenting the analysis report, including the classification, to the healthcare practitioner user via a role-based user instance of the end user application,
         wherein the healthcare practitioner user modifies a course of treatment for the individual under study according to the analysis report.

2. The system of claim 1 wherein the classifier model is configured to identify a correlation between (i) the behavior data and symptom measurement data and (ii) data collected in connection with individuals who have exhibited desirable treatment response times.

3. The system of claim 2 wherein the correlation identifies at least one of an effective intervention, treatment efficacy, and drug performance.

4. The system of claim 1 wherein the composite profile is configured to classify the individual under study with respect to a likelihood of at least one of an onset or a progression of the condition of the individual under study.

5. The system of claim 1 further comprising a usage analytics database communicably engaged with the analytics module, wherein the usage analytics database is configured to store usage analytics data and provide the usage analytics data to the analytics module.

6. The system of claim 1 further comprising a content module configured to generate one or more content queries based at least in part on the classified behavior data.

7. The system of claim 6 wherein the content module is further configured to:
    submit the one or more content queries to at least one content library comprising a content index; and
    analyze content received from the at least one content library to determine a relevance to a status of the individual determined based on the classified behavior data.

8. The system of claim 1 wherein processing the classified user activity data and the classified behavior data comprises analyzing one or more contextual input or domain input according to at least one machine learning model to generate at least one predictive content for the analysis report.

9. The system of claim 1 wherein the access permissions are configured to selectively restrict access to or input of one or more of the behavior data, the symptom measurement data and medicine regimen data for the one or more other users.

\* \* \* \* \*